US012584589B2

(12) United States Patent　　(10) Patent No.:　US 12,584,589 B2

Young et al.　　(45) Date of Patent:　Mar. 24, 2026

(54) INHIBITING THE CHAMPAGNE EFFECT IN HYDROSTATICALLY COMPENSATED CAES SYSTEMS

(71) Applicant: Hydrostor Inc., Toronto (CA)

(72) Inventors: Davin Young, Toronto (CA); Craig Branch, London (GB); David Brown, Toronto (CA)

(73) Assignee: Hydrostor Inc., Toronto (CA)

( * ) Notice: Subject to any disclaimer, the term of this patent is extended or adjusted under 35 U.S.C. 154(b) by 0 days.

(21) Appl. No.: 18/557,477

(22) PCT Filed: Apr. 28, 2022

(86) PCT No.: PCT/CA2022/050656

§ 371 (c)(1),
(2) Date: Oct. 26, 2023

(87) PCT Pub. No.: WO2022/226656

PCT Pub. Date: Nov. 3, 2022

(65) Prior Publication Data

US 2024/0218885 A1　　Jul. 4, 2024

Related U.S. Application Data

(60) Provisional application No. 63/181,327, filed on Apr. 29, 2021.

(51) Int. Cl.
F17C 1/00　　(2006.01)
B65G 5/00　　(2006.01)
(Continued)

(52) U.S. Cl.
CPC ................ F17C 1/007 (2013.01); B65G 5/00 (2013.01); F02C 6/16 (2013.01); F17C 13/02 (2013.01); Y02E 60/16 (2013.01)

(58) Field of Classification Search
CPC . B65G 5/00; F03B 13/06; F03B 13/10; Y02E 60/16; F17C 1/007; F17C 13/02
See application file for complete search history.

(56) References Cited

U.S. PATENT DOCUMENTS

| | | | |
|---|---|---|---|
| 1,382,569 | A | 6/1921 | Tait |
| 2,749,714 | A | 6/1956 | Hunter |

(Continued)

FOREIGN PATENT DOCUMENTS

| | | |
|---|---|---|
| AU | 2006233241 A1 | 5/2007 |
| CA | 1073223 A | 3/1980 |

(Continued)

OTHER PUBLICATIONS

Wang, J. et al., Overview of Compressed Air Energy Storage and Technology Development; Energies; 2017; 10, 991; 22 pages; http:!/wrap.warwick.ac. uk/91858/7/WRAP-overview-compressed-air-energy-storage-technology-Jevelopment-Wang-2017.pdf.

(Continued)

*Primary Examiner* — Michael Leslie
(74) *Attorney, Agent, or Firm* — Young Basile Hanlon & MacFarlane, P.C.

(57)　　　　　ABSTRACT

A method of operating a hydrostatically compensated compressed air energy storage system comprising to inhibit champagne effect conditions, can include charging the system; changing the system into a storage mode; and before a dissolved gas concentration in a layer of compensation liquid exceeds a champagne effect saturation threshold, operating the system in a dilution cycle mode that can include i) discharging at least a portion of the compressed air from the accumulator thereby drawing additional compensation liquid having a lower dissolved gas concentration than the liquid in the layer of compensation liquid into the accumulator, and ii) re-charging the system by conveying additional compressed air into the layer of compressed air in (Continued)

the accumulator thereby displacing a corresponding amount of compensation liquid from the layer of compensation liquid into a compensation liquid flow path and returning the system to the storage mode.

20 Claims, 10 Drawing Sheets

(51) Int. Cl.
  *F02C 6/16* (2006.01)
  *F17C 13/02* (2006.01)

(56) References Cited

U.S. PATENT DOCUMENTS

| | | | |
|---|---|---|---|
| 3,019,854 A | 2/1962 | O'Bryant |
| 3,643,426 A | 2/1972 | Janelid |
| 3,895,493 A | 7/1975 | Rigollot |
| 3,939,356 A | 2/1976 | Loane |
| 3,988,897 A | 11/1976 | Strub |
| 3,996,741 A | 12/1976 | Herberg |
| 4,085,971 A | 4/1978 | Jacoby |
| 4,147,204 A | 4/1979 | Pfenninger |
| 4,150,547 A | 4/1979 | Hobson |
| 4,343,569 A | 8/1982 | Schwarzenbach |
| 4,355,923 A | 10/1982 | Schwarzenbach |
| 4,391,552 A | 7/1983 | O'Hara |
| 4,392,354 A | 7/1983 | Schwarzenbach |
| 4,399,656 A | 8/1983 | Laing et al. |
| 4,403,477 A | 9/1983 | Schwarzenbach |
| 4,450,547 A | 5/1984 | Nakamura et al. |
| 4,454,721 A | 6/1984 | Hurlimann et al. |
| 4,523,432 A | 6/1985 | Frutschi |
| 4,538,414 A | 9/1985 | Saleh |
| 4,727,930 A | 3/1988 | Bruckner et al. |
| 5,634,340 A | 6/1997 | Grennan |
| 6,167,951 B1 | 1/2001 | Couch et al. |
| 6,185,841 B1 | 2/2001 | Conochie |
| 6,467,535 B1 | 10/2002 | Shembekar et al. |
| 6,637,977 B2 | 10/2003 | Hayashi et al. |
| 6,739,522 B2 | 5/2004 | Laumen |
| 7,663,255 B2 | 2/2010 | Kim et al. |
| 7,755,212 B2 | 7/2010 | Enis et al. |
| 8,136,354 B2 | 3/2012 | Havel |
| 8,277,145 B2 | 10/2012 | Dickinson, III et al. |
| 8,663,255 B2 | 3/2014 | Torain et al. |
| 8,739,522 B2 | 6/2014 | Anikhindi et al. |
| 9,045,209 B2 | 6/2015 | Zeren et al. |
| 9,322,296 B2 | 4/2016 | Hugo et al. |
| 9,383,105 B2 | 7/2016 | Naeve |
| 9,404,512 B2 | 8/2016 | Dämgen et al. |
| 9,422,948 B2 | 8/2016 | Kim et al. |
| 9,433,910 B2 | 9/2016 | Wyttenbach et al. |
| 9,739,536 B2 | 8/2017 | Erben et al. |
| 9,777,965 B2 | 10/2017 | Chordia et al. |
| 9,803,603 B2 | 10/2017 | Ganser |
| 9,803,803 B1 | 10/2017 | Adams et al. |
| 10,859,207 B2 | 12/2020 | Lewis et al. |
| 11,274,792 B2 | 3/2022 | Stradiotto et al. |
| 11,519,393 B2 | 12/2022 | Lewis et al. |
| 11,591,957 B2 | 2/2023 | Howitt |
| 11,644,150 B2 | 5/2023 | Stradiotto et al. |
| 11,767,950 B2 | 9/2023 | Lewis et al. |
| 11,821,584 B2 | 11/2023 | Stradiotto et al. |
| 11,835,023 B2 | 12/2023 | Young et al. |
| 2003/0021631 A1 | 1/2003 | Hayashi et al. |
| 2005/0004416 A1 | 1/2005 | Okutsu et al. |
| 2008/0000233 A1 | 1/2008 | Althaus et al. |
| 2010/0218500 A1 | 9/2010 | Ruer |
| 2010/0248500 A1 | 9/2010 | Ting et al. |
| 2011/0094212 A1 | 4/2011 | Ast et al. |
| 2011/0094229 A1 | 4/2011 | Freund et al. |
| 2011/0094231 A1 | 4/2011 | Freund |
| 2011/0094242 A1 | 4/2011 | Koerner |
| 2011/0100010 A1 | 5/2011 | Freund et al. |
| 2011/0296823 A1 | 12/2011 | McBride et al. |
| 2012/0057998 A1 | 3/2012 | Ingersoll et al. |
| 2012/0067047 A1 | 3/2012 | Peterson et al. |
| 2012/0102954 A1 | 5/2012 | Ingersoll et al. |
| 2012/0174569 A1 | 7/2012 | Ingersoll et al. |
| 2012/0297776 A1 | 11/2012 | Bollinger et al. |
| 2013/0061591 A1 | 3/2013 | Bove et al. |
| 2014/0013735 A1 | 1/2014 | McBride et al. |
| 2014/0020369 A1 | 1/2014 | Guidati |
| 2015/0000248 A1 | 1/2015 | del Omo |
| 2015/0015210 A1 | 1/2015 | Bradwell et al. |
| 2015/0019096 A1 | 1/2015 | Kim |
| 2015/0091301 A1 | 4/2015 | Littmann et al. |
| 2015/0114611 A1 | 4/2015 | Morris et al. |
| 2015/0125210 A1 | 5/2015 | Ingersoll et al. |
| 2015/0267612 A1 | 9/2015 | Bannari |
| 2016/0032783 A1 | 2/2016 | Howes et al. |
| 2016/0231072 A1 | 8/2016 | Pohlman |
| 2017/0013867 A1 | 1/2017 | Kelleher et al. |
| 2017/0138674 A1 | 5/2017 | Pourima |
| 2017/0159503 A1 | 6/2017 | Plais et al. |
| 2017/0350658 A1 | 12/2017 | Kerth et al. |
| 2018/0017213 A1 | 1/2018 | Deleau et al. |
| 2018/0094581 A1 | 4/2018 | Teixeira |
| 2018/0179916 A1 | 6/2018 | Larochelle et al. |
| 2018/0313270 A1 | 11/2018 | Jones et al. |
| 2019/0011593 A1 | 1/2019 | Marsala et al. |
| 2019/0346082 A1 | 11/2019 | Lewis et al. |
| 2020/0103178 A1 | 4/2020 | Gerstler et al. |
| 2021/0207586 A1 | 7/2021 | Lewis et al. |
| 2021/0207771 A1 | 7/2021 | Lewis et al. |
| 2021/0388809 A1 | 12/2021 | Young et al. |
| 2021/0388810 A1 | 12/2021 | Young et al. |
| 2022/0090585 A1 | 3/2022 | Lewis et al. |
| 2022/0196341 A1 | 6/2022 | Young et al. |
| 2023/0110494 A1 | 4/2023 | Lewis et al. |
| 2023/0332843 A1 | 10/2023 | Lewis et al. |
| 2024/0035621 A1 | 2/2024 | Stradiotto et al. |
| 2024/0191725 A1 | 6/2024 | Young et al. |
| 2024/0218885 A1 | 7/2024 | Young et al. |

FOREIGN PATENT DOCUMENTS

| | | | | |
|---|---|---|---|---|
| CA | 1160063 A | 1/1984 | | |
| CA | 1179511 A | 12/1984 | | |
| CA | 1281611 C | 3/1991 | | |
| CA | 2785004 A1 | 6/2011 | | |
| CA | 2807502 A1 | 2/2012 | | |
| CA | 2824798 A1 | 7/2012 | | |
| CA | 2982255 A1 | 10/2016 | | |
| CA | 3052080 A1 | 8/2018 | | |
| CA | 3055620 A1 | 9/2018 | | |
| CN | 103206349 A | 7/2013 | | |
| CN | 205422944 U | 8/2016 | | |
| CN | 107842392 A | 3/2018 | | |
| CN | 207847852 U | 9/2018 | | |
| DE | 2636417 A1 | 2/1978 | | |
| DE | 102010055750 A1 | 6/2012 | | |
| EP | 0044581 A1 * | 1/1982 | .............. | B65G 5/00 |
| EP | 0566868 A1 | 10/1993 | | |
| EP | 1443177 A1 | 8/2004 | | |
| EP | 2447501 A2 | 5/2012 | | |
| EP | 2450549 A2 | 5/2012 | | |
| EP | 2530283 A1 | 12/2012 | | |
| EP | 2549090 A1 | 1/2013 | | |
| EP | 2559881 A2 | 2/2013 | | |
| EP | 2832666 A1 | 2/2015 | | |
| FR | 2706432 A1 | 12/1994 | | |
| FR | 3019854 A1 | 10/2015 | | |
| FR | 3023321 A1 | 1/2016 | | |
| GB | 1213112 A | 11/1970 | | |
| GB | 2013318 A | 8/1979 | | |
| GB | 2528449 A | 1/2016 | | |
| JP | S54133211 A | 10/1979 | | |
| JP | S55-115498 U | 8/1980 | | |
| JP | S5797997 A | 6/1982 | | |
| JP | H0275730 A | 3/1990 | | |
| JP | H04121424 A | 4/1992 | | |
| JP | H05214888 A | 8/1993 | | |

(56) References Cited

FOREIGN PATENT DOCUMENTS

| | | | |
|---|---|---|---|
| JP | H07330079 | A | 12/1995 |
| JP | H09-154244 | A | 6/1997 |
| JP | 2636417 | B2 | 7/1997 |
| JP | H09287156 | A | 11/1997 |
| JP | H1121926 | A | 1/1999 |
| JP | 2005009609 | A | 1/2005 |
| JP | 2013509528 | A | 3/2013 |
| JP | 2016211515 | A | 12/2016 |
| WO | 1998039613 | A1 | 9/1998 |
| WO | 2011053411 | A1 | 5/2011 |
| WO | 2012097216 | A1 | 7/2012 |
| WO | 2013131202 | A1 | 9/2013 |
| WO | 2014183894 | A1 | 11/2014 |
| WO | 2015015184 | A2 | 2/2015 |
| WO | 2015019096 | A1 | 2/2015 |
| WO | 2015159278 | A1 | 10/2015 |
| WO | 2016012764 | A1 | 1/2016 |
| WO | 2016131502 | A1 | 8/2016 |
| WO | 2016185906 | A1 | 11/2016 |
| WO | 2017093768 | A1 | 6/2017 |
| WO | 2017140481 | A1 | 8/2017 |
| WO | 2017194253 | A1 | 11/2017 |
| WO | 2017198397 | A1 | 11/2017 |
| WO | 2018141057 | A1 | 8/2018 |
| WO | 2018161172 | A1 | 9/2018 |
| WO | 2019011593 | A1 | 1/2019 |
| WO | 2019218084 | A1 | 11/2019 |
| WO | 2019218085 | A1 | 11/2019 |
| WO | 2020146938 | A1 | 7/2020 |
| WO | 2020160635 | A1 | 8/2020 |
| WO | 2020160670 | A1 | 8/2020 |
| WO | 2020160681 | A1 | 8/2020 |
| WO | 2020172748 | A1 | 9/2020 |
| WO | 2022213179 | A1 | 10/2022 |
| WO | 2022226656 | A1 | 11/2022 |
| WO | 2024130447 | A1 | 6/2024 |

OTHER PUBLICATIONS

RWE Power AG: Essen/Kain, "ADELE—Adiabatic Compressed-Air Energy Storage for Electricity Supply", Feb. 3, 2011; http://www.rwe.com/web/cms/mediablob/en/391748/data/235554/1/rwe-power-ag/press/company/Brochure- ADELE.pdf.

Laubscher, Hendrik et al. "Developing a cost effective rock bed thermal energy storage system: Design and modelling", article published Jun. 27, 2017.

Jorio, Luigi, "A huge battery made of air" online article published Aug. 10, 2016, available at https:// www.swissinfo.ch/eng/sci-tech/energy-in-the-mountains_a-huge-battery-made-of-air/42362400.

Shell and Tube Heat Exchangers article available online from Thermopedia as of Feb. 8, 2011, available at https://www.thermopedia.com/content/1121 /.

"Coil-Wound Heat Exchangers (CWHEs)" publication from Linde Engineering, copyright 2018-2019, available online at https://assets.linde.com/-/media/global/engineering/engineering/home/products-and-services/plant-components/plate-fin-heat-exchangers/coil-wound-heat-exchanger-2019.pdf.

Sequi, P.M., "Modelling of the Dynamic Behavior of an Advanced Adiabatic Compressed Air Energy Storage (AA-CAES", Escuela Tecnica Superior de Ingenieros Industriales-UPM, (20181100), pp. 41-117, URL: http://oa.upm.es/53802/1/TFG_PABLO_MARTIN_SEQUI.pdf, (Mar. 25, 2020), XP055731474.

* cited by examiner

900

902

INHIBITING THE CHAMPAGNE EFFECT IN HYDROSTATICALLY COMPENSATED CAES SYSTEMS

CROSS-REFERENCE TO RELATED APPLICATIONS

This application claims the benefit of an priority to U.S. provisional appn. no. 63/181,327 filed Apr. 29, 2021 and entitled A SYSTEM AND METHOD FOR MITIGATING THE CHAMPAGNE EFFECT IN HYDROSTATICALLY COMPENSATED CAES, the entirety of which is incorporated herein by reference.

FIELD

The present disclosure relates generally to compressed gas energy storage, and more particularly to a compressed gas energy storage system such as, for example, one including a hydrostatically compensated, compressed air energy storage accumulator located underground, the use thereof.

INTRODUCTION

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus there exists a need for effectively storing the electrical energy produced at a power grid or a renewable source during a non-peak period and providing it to the grid upon demand. Additionally, to the extent that the infrastructural preparation costs and the environmental impact from implementing such infrastructure are minimized, the utility and desirability of a given solution is enhanced.

Furthermore, as grids transform and operators look to storage in addition to renewables to provide power and remove traditional forms of generation that also provide grid stability, such as voltage support, a storage method that offers inertia based synchronous storage is highly desirable.

U.S. Pat. No. 3,996,741 discloses a system and apparatus for the storage of energy generated by natural elements. Energy from natural elements such as from the sun, wind, tide, waves, and the like, is converted into potential energy in the form of air under pressure which is stored in a large, subterranean cell. Machines of known types such as windmills are driven by natural elements to operate air compressors. Air compressors pump the air under pressure to the storage cell. Air entering the storage cell displaces water from the cell which returns to a water reservoir as an ocean or a lake. Water locks the air in the storage cell. The stored compressed air is available upon demand to perform a work function as driving an air turbine to operate an electric generator.

US patent publication no. US2013/0061591 discloses, during an adiabatic compressed air energy storage (ACAES) system's operation, energy imbalances may arise between thermal energy storage (TES) in the system and the thermal energy required to raise the temperature of a given volume of compressed air to a desired turbine entry temperature after the air is discharged from compressed air storage of the ACAES system. To redress this energy imbalance it is proposed to selectively supply additional thermal energy to the given volume of compressed air after it received thermal energy from the TES and before it expands through the turbine. The additional thermal energy is supplied from an external source, i.e. fuel burnt in a combustor. The amount of thermal energy added to the given volume of compressed air after it received thermal energy from the TES is much smaller than the amount of useful work obtained from the given volume of compressed air by the turbine.

International patent publication no. WO 2018/141057 discloses a compressed gas energy storage system that may include an accumulator for containing a layer of compressed gas atop a layer of liquid. A gas conduit may have an upper end in communication with a gas compressor/expander subsystem and a lower end in communication with accumulator interior for conveying compressed gas into the compressed gas layer of the accumulator when in use. A shaft may have an interior for containing a quantity of a liquid and may be fluidly connectable to a liquid source/sink via a liquid supply conduit. A partition may cover may separate the accumulator interior from the shaft interior. An internal accumulator force may act on the inner surface of the partition and the liquid within the shaft may exert an external counter force on the outer surface of the partition, whereby a net force acting on the partition is less than the accumulator force.

U.S. Pat. No. 4,391,552 discloses a compressed air energy storage system including a subterranean cavern, a ground level reservoir, a generally vertical shaft and a tunnel connecting the cavern and the lower end of the shaft is disclosed. Air bubbles which form in and rise through the water in the shaft are concentrated at the center of the shaft to thereby form a substantially air free water column in the shaft to insure a constant hydrostatic head in the cavern. The air bubbles are concentrated by imparting a spiral motion to the air bubble/water mixture, primarily with a number of nozzles which inject water into the shaft. Spiral vanes mounted along the interior surface of the shaft, but leaving the shaft substantially unobstructed, aid in imparting rotary motion to the mixture. The bubbles rise along the axis of the shaft and are discharged into the atmosphere. A number of bypass passages parallel the upper region of the shaft and fluidly connect the reservoir with openings in the shaft located a short distance above the nozzles.

U.S. Pat. No. 4,355,923 discloses a constant pressure air storage installation for gas turbine power plants containing a cavern and a water supply. In order to reduce the turbulence formation within the water and thus the diffusion of air into the water of the water supply there are provided means which serve to uniformly distribute over the cross-section of the cavern the water flow which arises during charging and discharging of the air space of the cavern and to render more uniform the velocity of such water flow.

U.S. Pat. No. 4,343,569 discloses an apparatus for preventing the blowing out of the water supply of constant pressure air storage installations for gas turbine power plants, which is intended to be installed as a preferably prefabricated unit at the upper end of a riser tube or pipe of an air storage cavern. The apparatus contains venting tubes, the lower ends of which are staggered in elevation. Further, there are provided guide elements which, on the one hand, guide part of the water-air mixture flowing out of the riser tube into the vent tubes or pipes and, on the other hand, form an extended flow channel for the remaining water-air mixture which directly flows into a compensation basin.

U.S. Pat. No. 3,895,493 discloses an invention related to storing and redelivering energy in the form of compressed air under a constant pressure by hydraulically compensating for pressure variations in a reservoir by permanently connecting the reservoir to a lake and by dissipating energy of air dissolved in water by reducing the concentration of the air in the water by communicating the lower portion of a conduit, which contains gasified water, with nongasified water from the lake whereby to block the flow of gasified water completely through the conduit. Furthermore, a plant of the invention uses a well containing a conduit on which is mounted a unidirectional valve for achieving the dilution.

U.S. Pat. No. 3,939,356 discloses a hydro-air storage system for generating electricity in which a subterranean reservoir containing water is pressurized and the water is pumped to a surface reservoir during periods when the demand for electricity is low and in which water from the surface reservoir flowing into the subterranean reservoir and compressed air released from the subterranean reservoir are both utilized to generate electricity during periods when the demand for electricity is high.

While many of the systems described above are generally directed at mechanisms for dealing with water columns that are experiencing champagne-effect type situations, such as by placing vanes, flow directors, valves and the like in the affected water column, there remains a need for a hydro-statically compensated compressed air energy storage system that is configured and/or operated in a manner that can help inhibit or prevent the champagne effect type conditions from occurring in the accumulator or associated water columns. That is, a system that can help reduce the chances that a champagne effect condition will occur, rather than being directed at trying to deal with or mitigate the effect of a champagne effect event once it has happened. Therefore, there remains a need for a hydrostatically compensated compressed air energy storage system that is configured and/or operated in a manner that can help inhibit or prevent the champagne effect type conditions such as by limiting the accumulation of potentially problematic amounts of dis-solved gas within the compensation water in the system before champagne effect conditions are present/initiated.

SUMMARY OF THE INVENTION

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive compressors and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive any suitable expander apparatus or the like, and ultimately to be used to drive a generator or the like to produce electricity. The amount of energy that can be stored in a given compressed gas energy storage system may be related to the pressure at which the gas is compressed/stored, with higher pressure storage generally facilitating a higher energy storage for a given accumulator/system volume.

In hydrostatically compensated compressed air energy storage systems compensation liquid, such as water, at the desired system or accumulator pressure can flow out of and into the accumulator as the system is charged and dis-charged, respectively, thereby helping to maintain the inte-rior of the accumulator at the desired or target system pressure during the charging and discharging processes even as the quantity of air in the accumulator changes. This compensation liquid can be supplied to the accumulator via a compensation liquid shaft that can also be connected to a source/sink that can hold additional compensation liquid/water. The system is preferably configured so that a quantity of compensation liquid within the accumulator isolates the compressed gas in the accumulator from the compensation liquid shaft, and functions as a liquid/water seal. Keeping a sufficient amount of liquid within the accumulator can prevent gas from escaping into the compensation liquid shaft, which can make it impossible to recover the energy stored in the gas that bubbles out via the compensation liquid column (rather than being extracted via the compressor and expander subsystem) and can have undesirable impacts on the compensation liquid flow path and overall system per-formance.

In some examples of such hydrostatically compensated compressed air energy storage systems the compressed gas can be soluble in the compensation liquid (e.g. air may be soluble in water). As there is a relatively large surface area/interface between the layer of gas and the layer of compensation liquid in the accumulator, the air may tend to dissolve into the water within the accumulator. The amount of air that can dissolve in the water can be a function of the pressure within the accumulator (i.e. the pressure of the gas and the compensation liquid at the interface) and the length of time the gas is in contact with the water. When the system is in a hold/storage mode (e.g. when the gas is being stored at the system pressure instead of flowing in and out) the compensation liquid may also be generally static in some examples. This can lead to more air being dissolved in the portion of the compensation liquid that is within the accu-mulator than the portion of the compensation that remains in the shaft or source/sink and is not in contact with the compressed gas. If the system is then operated in its charging mode, additional gas can be conveyed into the accumulator and some of the compensation liquid that contains relatively higher amounts of dissolved gas can be displaced from the accumulator into the shaft, bringing with it a relatively large amount of dissolved gas. In some circumstances this may lead to the champagne effect.

For the purpose the teachings herein, the champagne effect is understood to refer to a two-phase flow instability that could occur in a hydraulically compensated CAES facility. This effect may be a direct result of the solubility of high-pressure air in water which causes air to dissolve into the compensation water in the accumulator. During system charging, as this liquid is moved from the accumulator into the shaft, this can lead to a mass transport of dissolved air that bypasses the water seal as a dissolved gas in the compensation liquid flowing out of the accumulator. As the partially air saturated water transits up the compensation liquid shaft, it experiences a drop in pressure as the hydrostatic pressure of the liquid decreases. As the amount of gas the compensation liquid can hold varies with pressure, e.g. liquid water can hold less dissolved gas at lower pressures, the dissolved air can come out of solution within the compensation liquid shaft and becomes gaseous again— forming air bubbles. The bubbles displace water within the shaft, lessening the overall amount of water within the shaft. As the air and water mixture weighs less than water a pressure imbalance forms which causes the water to accelerate and move upwardly within the compensation liquid shaft at a faster rate than intended causing additional water to be drawn in from the accumulator.

The transient of the accelerated water flow is called the champagne effect. In some circumstances cases, the increase outflow of compensation liquid from the accumulator induced by the champagne effect can result in the level of water within the accumulator to fall below its desired minimum operating level and can even lead to the compensation liquid and/or air-water interface dropping to a point where the gas within the accumulator is in direct communication with the compensation liquid shaft, which can lead to a rapid and uncontrolled escape/venting of the compressed gas via the shaft and can be referred to as a cavern blowout. At a minimum, the champagne effect transient would accelerate the flow of water up the shaft to the compensation reservoir. Accordingly, there remains a need for systems and methods to help mitigate the likelihood and impact of the champagne effect on hydrostatically compensated compressed air/gas energy storage systems. This can include features of the system that make the champagne effect less likely to occur and/or can reduce its magnitude, methods of operating the system to help reduce the likelihood of the champagne effect occurring and/or techniques for monitoring the status of a system to help detect if the champagne effect is occurring.

In accordance with one broad aspect of the teachings described herein, a hydrostatically compensated compressed air energy storage system may include a dilution system configured to inhibit champagne effect conditions within a compensation liquid. The system may include an accumulator disposed underground and having an accumulator interior configured to contain a layer of compressed air above a layer of compensation liquid. A compressor and expander subsystem may be in fluid communication with the accumulator interior via an air flow path and configured to selectably convey compressed air into the accumulator at a storage pressure and to extract air from the accumulator. A compensation liquid reservoir may be spaced apart from the accumulator and in fluid communication with the layer of compensation liquid within the accumulator via a compensation liquid flow path whereby compensation liquid is displaced from the layer of compensation liquid when the compressed air is conveyed into the layer of compressed air when the system is in use. A dilution system may include a source of a dilution liquid and a dilution flow path in fluid communication with the accumulator interior and configured to supply a flow of the dilution liquid into the layer of compensation liquid when the system is in use thereby reducing an average dissolved gas concentration in the layer of compensation liquid within the accumulator.

The dilution liquid may mix with the compensation liquid in the layer of compensation liquid and exits the accumulator interior via the compensation liquid flow path.

The dilution liquid may contain less dissolved gas than the compensation liquid in the layer of compensation liquid.

The dilution liquid may have a higher density than the compensation liquid in the layer of compensation liquid.

The system may be operable in a charging mode in which the gas compressor and expander subsystem coveys compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode, and the dilution system may be configured to provide the flow of the dilution liquid into the layer of compensation liquid via the dilution flow path while the system is in the charging mode.

The system may be operable in a discharging mode in which air from the layer of compressed air exits the accumulator and drives the gas compressor and expander subsystem to generate electricity in response to a demand for electricity and a corresponding amount of compensation liquid may be re-introduced into the layer of compensation liquid within the accumulator interior via the compensation liquid flow path thereby maintaining the layer of compressed air at substantially the storage pressure during the discharging mode, and the dilution system may be configured to provide the flow of the dilution liquid into the layer of compensation liquid via the dilution flow path while the system is in the discharging mode.

The system may be operable in a storage mode in which there is no flow of the compressed air or compensation liquid and the layer of compressed air and the layer of compensation liquid are retained within the accumulator at substantially the storage pressure, and the dilution system may be configured to provide the flow of the dilution liquid into the layer of compensation liquid via the dilution flow path while the system is in the storage mode.

The compensation liquid in the layer of compensation liquid may include a first concentration of dissolved gas and wherein the dilution liquid is compensation liquid having a second concentration of dissolved gas that is lower than the first concentration.

The source of the dilution liquid may include the compensation liquid reservoir.

The dilution flow path may be configured to permit the flow of compensation liquid in the first direction into the accumulator and to inhibit a flow of compensation liquid in an opposing second direction out of the accumulator.

The dilution flow path may include a backflow limiter that prevents flow of the compensation liquid out of the accumulator via the dilution flow path.

The backflow limiter may be configured to allow dilution liquid to flow in the first direction into the accumulator interior in response to a low pressure suction condition within the accumulator interior.

The backflow limiter may include at least one check valve.

The dilution flow path may include a dilution conduit having a lower end that is disposed within the accumulator.

The lower end may be disposed in a lower 50% of the accumulator interior, or in a lower 25% of the accumulator interior.

The system may include a charge plane defined by an upper surface of the layer of compensation liquid when the system is in a fully charged configuration, and the lower end may be disposed below the charge plane.

The lower end may be positioned so that it is submerged within the layer of compensation liquid when the system is in the storage mode.

The compensation liquid flow path may include a compensation conduit extending between a lower end in communication with the accumulator interior and an upper end in communication with the compensation liquid reservoir. The lower end of the dilution conduit may be at a higher elevation than the lower end of the compensation conduit.

The lower end of the dilution conduit may be adjacent the lower end of the compensation conduit.

The lower end of the dilution conduit may be remote from the lower end of the compensation conduit.

The dilution conduit may be external the compensation conduit/shaft.

The dilution conduit may extend at least partially within the compensation conduit/shaft.

A pump may be disposed in the dilution flow path and may be configured to selectably pump the dilution liquid down the dilution flow path and into the accumulator interior.

The compensation liquid flow path may be configured to accommodate a first flow rate of the compensation liquid and the dilution flow path may be configured to accommodate a second flow rate of the compensation liquid that is less than 50% of the first flow rate.

The second flow rate may be less than 25% of the first flow rate.

A gas monitoring system may be operable to monitor an amount of dissolved gas present in at least one of the layer of compensation liquid and the compensation liquid flow path and a controller that is linked to the gas monitoring system and that may be configured to generate a warning signal if the amount of dissolved gas present in the in at least one of the layer of compensation liquid and the compensation liquid flow path exceeds a warning threshold amount.

The controller may be configured to generate an alert signal if the amount of gas present in the in at least one of the layer of compensation liquid and the compensation liquid flow path exceeds an alert threshold amount.

The controller may be configured to automatically adjust the operation of at least one of the compressor and expander subsystem and the dilution system in response to the warning signal.

The gas monitoring system may include a collector configured to collect gas bubbles released from compensation liquid travelling in the compensation liquid flow path and a gas flow meter configured to measure a quantity of gas collected by the collector and provide a corresponding flow rate signal to the controller.

In accordance with another broad aspect of the teachings described herein, a method of operating a hydrostatically compensated compressed air energy storage system comprising an accumulator disposed underground and having an accumulator interior configured to contain a layer of compressed air at a storage pressure above a layer of compensation liquid to inhibit champagne effect conditions, the method may include: a) charging the system by compressing air to the storage pressure and conveying the compressed air into the layer of compressed air in the accumulator using a compressor and expander system thereby displacing a corresponding amount of compensation liquid from the layer of compensation liquid into a compensation liquid flow path outside the accumulator; b) changing the system into a storage mode in which the layer of compressed air and the layer of compensation liquid are retained within the accumulator at substantially the storage pressure, wherein while the system is in the storage mode the compressed air is in communication with the layer of compensation liquid for a storage contact time at least a portion of the compressed air in the layer of compressed air dissolves into the layer of compensation liquid thereby increasing a dissolved gas concentration in the layer of compensation liquid over time when the system is in the storage mode; c) before the dissolved gas concentration in the layer of compensation liquid exceeds a champagne effect saturation threshold, operating the system in a dilution cycle mode that can include: i. discharging at least a portion of the compressed air from the accumulator thereby drawing additional compensation liquid having a lower dissolved gas concentration than the liquid in the layer of compensation liquid into the accumulator from the compensation liquid flow path, and thereby reducing an average dissolved gas concentration in the layer of compensation liquid, and then; ii. re-charging the system by conveying additional compressed air into the layer of compressed air in the accumulator thereby displacing a corresponding amount of compensation liquid from the layer of compensation liquid into a compensation liquid flow path and returning the system to the storage mode.

The method may include changing the system from the storage mode to the dilution cycle mode before the storage contact time meets or exceeds a pre-determined dilution cycle time.

The dilution cycle time may be between 1 day and 6 months.

The dilution cycle time may be between 2 days and 4 weeks.

A system controller may be configured to generate an output signal when the storage contact time meets the dilution cycle time.

The system controller may be configured to automatically switch the system from the storage mode to the dilution cycle mode when the storage contact time meets the dilution cycle time.

A champagne effect saturation threshold time may be defined as the amount of time it takes for the an amount of compressed air dissolved in the layer of compensation liquid to reach a champagne effect saturation concentration at the storage pressure, and the dilution cycle time may be less than the champagne effect saturation threshold time.

The method may include monitoring the dissolved gas concentration in at least one of the layer of compensation liquid and the compensation liquid flow path while the system is in the storage mode to determine a monitored gas concentration using a gas monitoring system and changing the system from the storage mode to the dilution cycle mode before or when the monitored gas concentration meets the champagne effect saturation threshold.

The method may include generating a warning signal using the controller if the current gas concentration is equal to or greater than a predetermined warning gas concentration that is lower than the champagne effect saturation threshold.

The warning gas concentration is between about 40% and about 100% of the champagne effect saturation threshold. The warning gas concentration may be between about 60% and about 90% of the champagne effect saturation threshold.

A system controller may be configured to automatically change the system to the dilution cycle mode when the current gas concentration is equal to or greater than a predetermined warning gas concentration.

The champagne effect saturation threshold may be equal to or less than about 100, 95, 90, 85, 80, 75, 70, 65, 60, 55, 50, 45, 40 or 30 mol air/m³ water, and may be less than about 80 mol air/m³

Changing the system from the storage mode to the dilution cycle mode may be done after charging the system but before the system is operated in a discharge mode in which air from the layer of compressed air exits the accumulator and drives the gas compressor and expander subsystem for the purpose of generating electricity in response to a demand for electricity.

The method may include introducing a flow of a dilution liquid into the layer of compensation liquid while the system is in the storage mode thereby replacing at least some of the compensation liquid in the layer of compensation liquid with the dilution liquid and reducing the dissolved gas concentration in the layer of compensation liquid without having to trigger the dilution cycle mode.

The flow of the dilution liquid may be conveyed from a dilution liquid source to the accumulator via a one-way dilution liquid flow path configured such that dilution liquid can flow from the dilution liquid source into the accumulator via the dilution liquid flow path but compensation liquid cannot flow exit the accumulator via the dilution liquid flow path.

The dilution liquid may include compensation liquid that was external the accumulator and has a lower concentration of dissolved air than the compensation liquid in the layer of compensation liquid when the system is the storage mode.

Step c)i) may include discharging at least 20%, 40%, 60%, or 80% of the air from the accumulator and may include fully discharging the system.

In accordance with another broad aspect of the teachings described herein, a hydrostatically compensated compressed air energy storage system including a compensation circulation system configured to inhibit champagne effect conditions within a compensation liquid, may include an accumulator disposed underground and comprising an accumulator interior configured to contain a layer of compressed air above a layer of compensation liquid. A compressor and expander subsystem may be in fluid communication with the accumulator interior via an air flow path and may be configured to selectably convey compressed air into the accumulator at a storage pressure and to extract air from the accumulator. A compensation liquid reservoir may be spaced apart from the accumulator and may be in fluid communication with the layer of compensation liquid within the accumulator via a compensation liquid flow path whereby compensation liquid is displaced from the layer of compensation liquid when the compressed air is conveyed into the layer of compressed air when the system is in use. A compensation circulation system may be configured to exchange a quantity of compensation liquid between the layer of compensation liquid in the accumulator and the compensation liquid flow path independently of the addition or removal of compressed air from the accumulator, thereby reducing an average dissolved gas concentration in the layer of compensation liquid within the accumulator while the system is in use.

The compensation liquid in the compensation liquid flow path may contain less dissolved gas than the compensation liquid in the layer of compensation liquid.

The compensation liquid in the compensation liquid flow path may have a higher density than the compensation liquid in the layer of compensation liquid.

The system may optionally be operable in a) a charging mode in which the gas compressor and expander subsystem coveys compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode, b) a discharging mode in which air from the layer of compressed air exits the accumulator and drives the gas compressor and expander subsystem to generate electricity in response to a demand for electricity and a corresponding amount of compensation liquid is re-introduced into the layer of compensation liquid within the accumulator interior via the compensation liquid flow path thereby maintaining the layer of compressed air at substantially the storage pressure during the discharging mode; and c) a storage mode in which there is no flow of the compressed air or compensation liquid and the layer of compressed air and the layer of compensation liquid are retained within the accumulator at substantially the storage pressure, and the compensation circulation system is configured to exchange the quantity of compensation liquid between the layer of compensation liquid in the accumulator and the compensation liquid flow path independently of the addition or removal of compressed air from the accumulator and while the system is in the storage mode.

When the system is in the storage mode the compensation liquid in the layer of compensation liquid may include a first concentration of dissolved gas and the compensation liquid in the compensation liquid flow path outside the accumulator may have a second concentration of dissolved gas that is lower than the first concentration.

The compensation liquid flow path may include a compensation conduit extending between a lower end in communication with the accumulator interior and an upper end in communication with the compensation liquid reservoir and the compensation circulation system may include a circulation device that is selectably operable to convey liquid between the layer of compensation liquid and the compensation conduit.

A dilution system may include a source of a dilution liquid and a dilution flow path in fluid communication with the accumulator interior and configured to supply a flow of the dilution liquid into the layer of compensation liquid when the system is in use thereby reducing an average dissolved gas concentration in the layer of compensation liquid within the accumulator.

In accordance with another broad aspect of the teachings described herein, a hydrostatically compensated compressed air energy storage system may include an accumulator disposed underground and comprising an accumulator interior configured to contain a layer of compressed air above a layer of compensation liquid. A compressor and expander subsystem may be in fluid communication with the accumulator interior via an air flow path and may be configured to selectably convey compressed air into the accumulator at a storage pressure and to extract air from the accumulator. A compensation liquid reservoir may be spaced apart from the accumulator and may be in fluid communication with the layer of compensation liquid within the accumulator via a compensation liquid flow path that may include a compensation conduit extending between a lower end in communication with the accumulator interior and an upper end in communication with the compensation liquid reservoir. Compensation liquid may be displaced from the layer of compensation liquid and may travel upwardly through the compensation conduit when the compressed air is conveyed into the layer of compressed air when the system is in use. A gas monitoring system may be operable to detect an amount of gas that comes out of solution from the compensation liquid as the compensation liquid travels upwardly through the compensation conduit. A controller may be communicably linked to the gas monitoring system and may be configured to generate an output signal if the amount of gas detected by the gas monitoring system exceeds a pre-determined monitoring threshold amount.

The gas monitoring system may include a cap disposed toward the upper end of the compensation conduit and configured to collect the gas that came out of solution from the compensation liquid as the compensation liquid travels upwardly through the compensation conduit and a gas flow that is fluidly connected downstream from the cap to receive and measure a flow rate of the gas collected by the cap and provide a corresponding signal to the controller.

The output signal may include a warning signal configured to provide at least one of a visual and audible alert a system operator.

The controller may be configured to automatically modify the operation of the compressor and expander subsystem when the amount of gas detected by the gas monitoring system exceeds a pre-determined monitoring threshold amount.

The controller may be configured to automatically stop the a flow of compressed air into the accumulator when the amount of gas detected by the gas monitoring system exceeds a pre-determined monitoring threshold amount.

A dilution system may include a source of a dilution liquid and a dilution flow path in fluid communication with the accumulator interior and configured to supply a flow of the dilution liquid into the layer of compensation liquid when the system is in use thereby reducing an average dissolved gas concentration in the layer of compensation liquid within the accumulator.

The controller may be configured to automatically activate the dilution system when the amount of gas detected by the gas monitoring system exceeds a pre-determined monitoring threshold amount.

A compensation circulation system may be configured to exchange a quantity of compensation liquid between the layer of compensation liquid in the accumulator and the compensation liquid flow path independently of the addition or removal of compressed air from the accumulator, thereby reducing an average dissolved gas concentration in the layer of compensation liquid within the accumulator while the system is in use.

The controller may be configured to automatically activate the compensation circulation system when the amount of gas detected by the gas monitoring system exceeds a pre-determined monitoring threshold amount.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
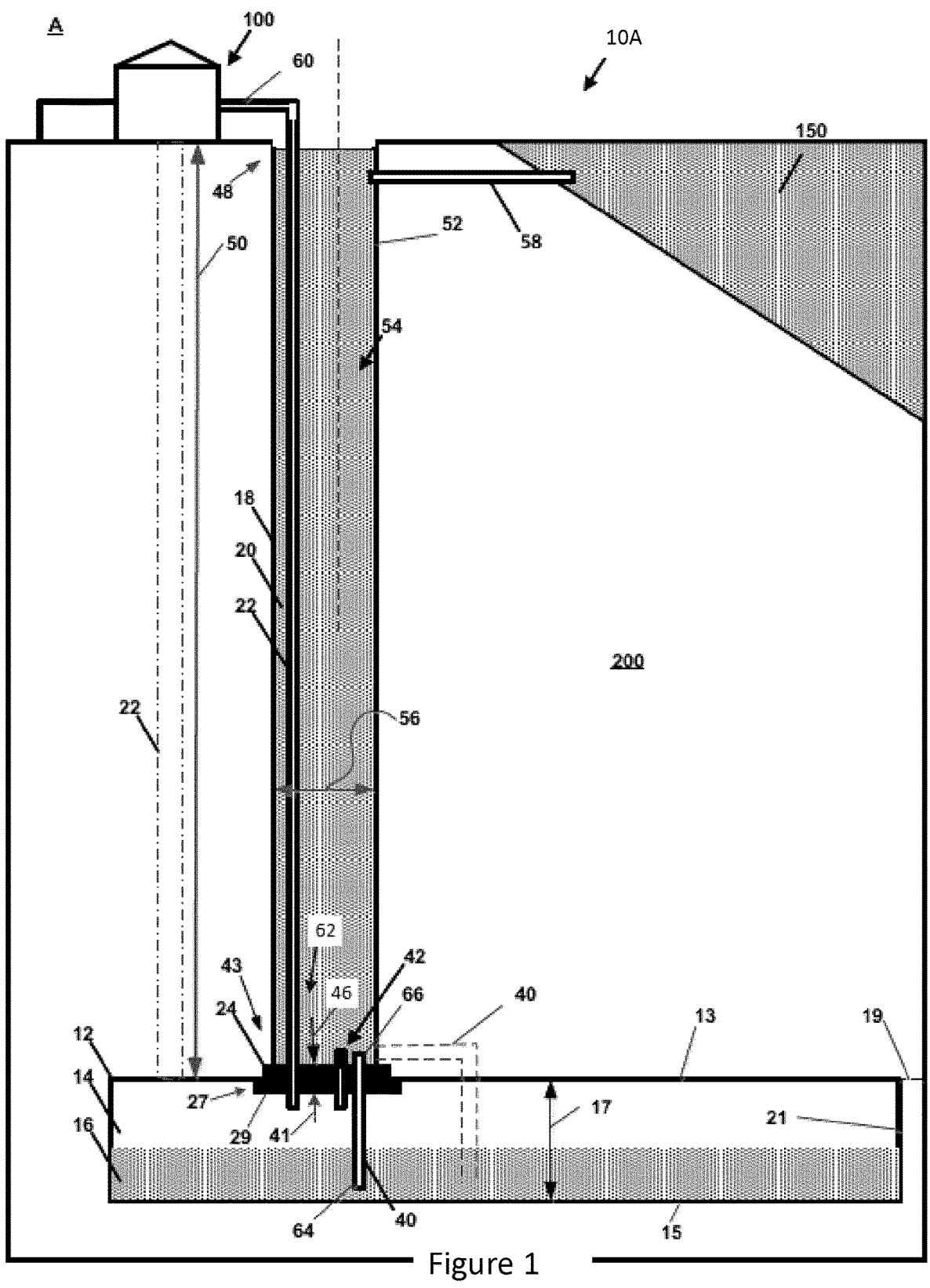
FIG. 1 is a schematic representation of one example of a hydrostatically compressed gas energy storage system.

Referring to FIG. 1 one example of a hydrostatically compensated compressed gas energy storage system 10A, that can be used to compress, store and release a gas, includes an accumulator 12 that is located underground (although in another embodiment the accumulator may be located above ground). In this example, the accumulator 12 serves as a chamber for holding both compressed gas and a compensation liquid (such as water or a slurry as described herein) and can include any suitable type of pressure vessel or tank, or as in this example can be an underground cave or chamber that is within ground 200. Optionally, the accumulator 12 may be lined, for example using concrete, metal, plastic and combinations thereof or the like, to help make it substantially gas and/or liquid impermeable so as to help prevent unwanted egress of gas or liquid from within its interior. In another embodiment, the accumulator can be bounded by suitable rock or other natural materials and can be substantially impermeable to gas and/or liquid without requiring a lining.

The accumulator 12 may have any suitable configuration, and in this schematic example, includes an upper wall 13 and an opposing lower wall 15 that are separated from each other by an accumulator height 17. The upper and lower walls 13 and 15 may be of any suitable configuration, including curved, arcuate, angled, and the like, and in the illustrated example are shown as generally planar surfaces, that are generally parallel to a horizontal reference plane 19. The accumulator 12 also has an accumulator width (not shown—measured into the page as illustrated in FIG. 1). The upper and lower walls 13 and 15, along with one or more sidewalls 21 at least partially define an interior of the accumulator 12, that has an accumulator volume.

The accumulator 12 in a given embodiment of the system 10A can be sized based on a variety of factors (e.g. the quantity of gas to be stored, the available space in a given location, etc.) and may, in some examples may be between about 1,000 m$^3$ and about 2,000,000 m$^3$ or more. For example, in this embodiment the accumulator 12 contains a layer of stored compressed gas 14, such as air, atop a layer of compensation liquid 16, such as water, and its volume (and thus capacity) can be selected based on the quantity of gas 14 to be stored, the duration of storage required for system 10A, the desired accumulator pressure, features/ parameters of the surrounding ground/rocks, compensation liquid composition and other suitable factors which may be related to the capacity or other features of a suitable power source and/or power load with which the system 10A is to be associated. The power source/load may be, in some examples, a power grid G (FIG. 2), a power source (including renewable and optionally non-renewable sources) and the like. Furthermore, the power source and power load may be completely independent of each other (e.g. the power source may be a renewable source, and the power load may be the grid).

Preferably, the accumulator 12 may be positioned below ground or underwater, but alternatively may be at least partially above ground. Positioning the accumulator 12 within the ground 200 at an accumulator depth, as shown, may allow the weight of the ground/soil to help backstop/ buttress the walls 13, 15 and 21 of the accumulator 12, and help resist any outwardly acting forces that are exerted on the walls 13, 15 and 21 of the interior 23 of the accumulator. Its depth in the ground, shown as an accumulator depth 50 in FIG. 1, is established according to the pressures at which the compression/expansion equipment to be used is most efficiently operated as this depth 50 and influence the hydrostatic pressure exerted by the compensation liquid, the geology in the surrounding area and the like. The depth 50 may be between about 200 m and about 700 m, and preferably may be between 400 m and 600 m and may be at least 500 m in some examples.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally without requiring further treatment. Similarly, the compensation liquid that is used can be any suitable liquid including water, hydrocarbons, oils, slurries or mixtures, combinations of water with other additives and the like. In this embodiment, the compressed gas 14 is compressed atmospheric air, and the liquid is water, but in other embodiments the liquid may be a slurry of water with suspended solids or other suitable liquids. Water may be preferably in some embodiments as it is relatively safe to work with and poses a relatively low environmental risk if some of the water leaks out of the system, as compared to oils and hydrocarbons. Water may also be relatively inexpensive to obtain and is not significantly corrosive or otherwise damaging to the system equipment. In some configurations, the compensation liquid may be mostly water but may include some additives, such as a cover film of oil or other such liquid that may help inhibit evaporation of the water and/or mixing or dissolving of the compressed air into the water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10A is in use. In this example, the accumulator 12 includes a primary opening 27 that is provided in the upper wall 13. The primary opening 27 may be any suitable size and may have a cross-sectional area that is adequate based on the specific requirements of a given embodiment of the system 10A. In one embodiment the cross-sectional area is between about 0.75 m$^2$ and about 80 m$^2$ but may be larger or smaller in a given embodiment.

Figure 4:
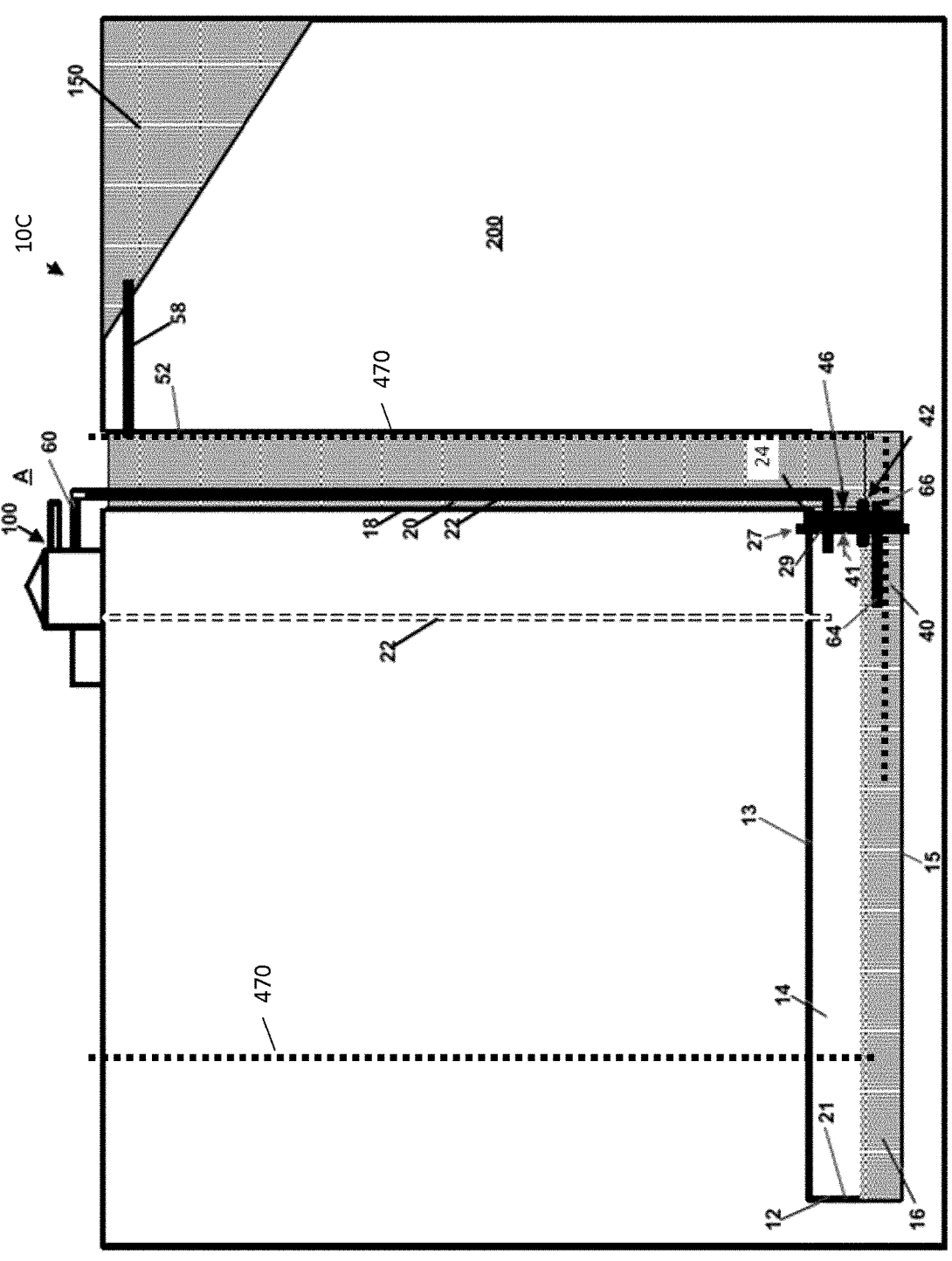
FIG. 4 is a schematic representation of another example of a hydrostatically compressed gas energy storage system.

When the system 10A is in use, the primary opening 27 may be sealed using any suitable type of partition that can function as a suitable sealing member. In the embodiment of FIG. 1, the system 10A includes a partition in the form of a bulkhead 24 that covers the primary opening 27 and that is arranged generally horizontally (as illustrated in FIG. 1). In other examples, such as a hydrostatically compensated compressed gas energy storage system 10C that is shown in FIG. 4, the bulkhead 24 can be oriented vertically such that it seals an opening in a sidewall of the accumulator 12. Other examples of suitable partitions are described in PCT/ CA2018/050112 and PCT/CA2018/050282, which are incorporated herein by reference.

When the bulkhead 24 is in place, as shown in FIG. 1, it can be secured to, and preferably sealed with the accumulator wall, in this embodiment upper wall 13, using any suitable mechanism to help seal and enclose the interior 23. In this embodiment the shaft 18 is illustrated schematically as a generally linear, vertical column. Alternatively, the shaft 18 may be a generally linear inclined shaft or preferably may be a curved and/or generally spiral/helical type configuration and which may be referred to as a shaft or generally as a decline. Some embodiments may include a generally spiralling configured decline that winds from an upper end to a lower end and can have an analogous function and attributes as the vertical shaft 18 of FIG. 1 despite having a different geometrical configuration. Discussions of the shaft/decline 18 and its purposes in one embodiment can be applied to other embodiments described herein. For example, in the examples described herein the shaft 18 is configured to function as the primary liquid connection between the accumulator 12 and the source of the compensation liquid. This shaft 18 is sized to accommodate the expected water flow rates as described herein, and is preferably configured to permit the outgoing flow of compensation water when the system is charging (as described herein) and to permit the opposite, incoming flow of compensation water when the system is discharging.

Figure 3:
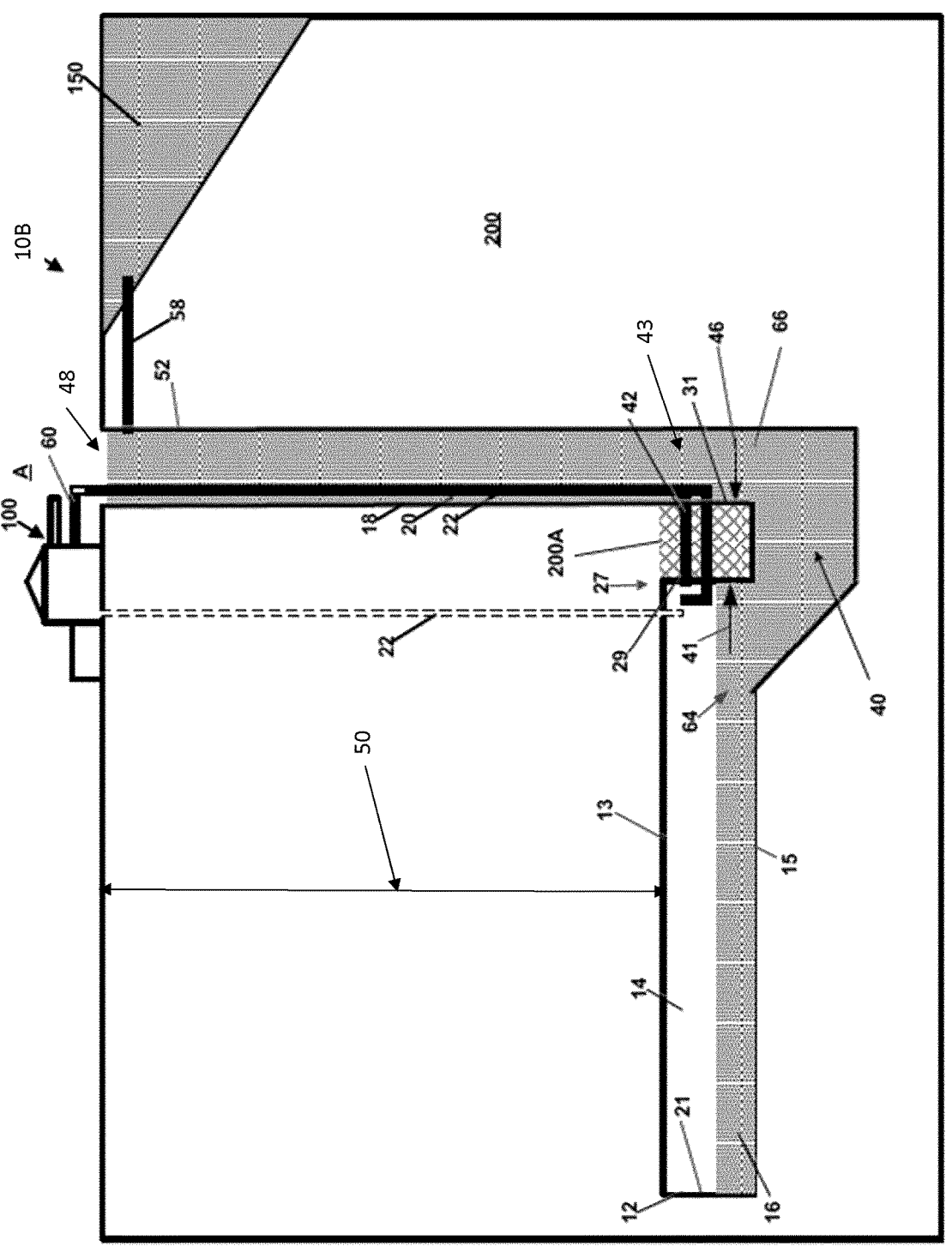
FIG. 3 is a schematic representation of another example of a hydrostatically compressed gas energy storage system.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21 as shown in FIGS. 3 and 4), in a lower surface (such as lower surface 15) or other suitable location. The location of the primary opening 27, and the associated partition, can be selected based on a variety of factors including, for example, the geology and underground conditions, the availability of existing structures (e.g. if the system 10A is being retrofit into some existing spaces, such as mines, quarries, storage facilities and the like), operating pressures, shaft configurations and the like. For example, some aspects of the systems 10A described herein may be retrofit into pre-existing underground chambers, which may have been constructed with openings in their sidewalls, floors and the like.

When the primary opening 27 extends along the sidewall 21 of the accumulator 12 as shown in the embodiment of FIG. 3, it may be positioned such that is contacted by only the gas layer 14 (i.e. toward the top of the accumulator 12), contacted by only the layer of compensation liquid 16 (i.e. submerged within the layer of compensation liquid 16 and toward the bottom of the accumulator) and/or by a combination of both the gas layer 14 and the layer of compensation liquid 16 (i.e. partially submerged and partially non-submerged in the liquid). The specific position of the free surface of the layer of compensation liquid 16 (i.e. the interface between the layer of compensation liquid 16 and the gas layer 14) may change while the system 10 is in use as gas is forced into (causing the liquid layer to drop) and/or withdrawn from the accumulator (allowing the liquid level to rise).

When the accumulator 12 is in use, at least one of the pressurized gas layer 14 and the layer of compensation liquid 16 may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24.

In the present embodiment, the system 10 includes a shaft 18 that is configured so its lower end 43 is in communication with the opening 27 of the accumulator 12, and its upper end 48 that is spaced apart from the lower end 43 by the accumulator depth 50 that also coincides with the shaft height in this example. At least one sidewall 52 extends from the lower end 43 to the upper end 48, and at least partially defines a shaft interior 54 having a volume. In this embodiment, the shaft 18 is generally linear and extends along a generally vertical shaft axis, but may have other configurations, such as a linear, curved, or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 m³ or more of a suitable compensation liquid.

In this arrangement, the bulkhead 24 is positioned at the interface between the shaft 18 and the accumulator 12, and the outer surface 31 (or at least a portion thereof) closes and seals the lower end 43 of the shaft 18. The bulkhead may include a variety of other elements to help facilitate operation of the system 10A, including a gas release valve illustrated schematically using reference character 42. Preferably, the other boundaries of the shaft 18 (e.g. the sidewall 52) are generally liquid impermeable, such that the interior 54 can be filled with, and can generally retain a quantity of a suitable compensation liquid 20. The compensation liquid 20 for a given system 10 can be chosen based on the features of the system, including the accumulator size, the accumulator depth 50 and its desired system operating/accumulator pressure. In some examples, the compensation liquid can be water, while in other examples the compensation liquid can be a slurry that has a higher density than water, which may help facilitate operating a given system at a higher accumulator pressure than if using water as the compensation liquid.

A compensation liquid supply/replenishment conduit 58 can provide fluid communication between the interior 54 of the shaft 18 and a compensation liquid source/sink 150 to allow compensation liquid to flow into or out of the interior of the shaft 18 as required when the system 10 is in operational modes. Optionally, a flow control apparatus may be provided in the compensation liquid supply/replenishment conduit 58. The flow control apparatus may include a valve (see 59 in FIG. 6a), sluice gate, or other suitable mechanism. The flow control apparatus can be open while the system 10 is in operational modes to help facilitate the desired flow of water between the shaft 18 and the compensation liquid source/sink 150. Optionally, the flow control apparatus can be closed to fluidly isolate the shaft 18 and the compensation liquid source/sink 150 if desired. For example, the flow control apparatus may be closed to help facilitate draining the interior 54 of the shaft 18 for inspection, maintenance or the like. One or more suitable pumps or other flow equipment may also be provided in this flow path if desired. In the illustrated examples, a compensation liquid flow path is defined between the compensation liquid source/sink 150 and the layer of compensation liquid 16 within the accumulator, and this path can include the shaft 18, compensation conduit 40, supply/replenishment conduit 58 and the compensation liquid source/sink 150, along with other suitable conduits or members. Compensation liquid can flow through this flow path when the system is in the charging and discharging modes.

The compensation liquid source/sink 150 may be of any suitable nature and configuration for a given system and for a given compensation liquid (e.g. water, slurry or other type of liquid). The compensation liquid source/sink 150 may include, for example, a generally open pond or reservoir (which may be configured to hold, water, slurry or the like), a purposely built reservoir, a storage tank, a water tower, a connection to a municipal water supply or reservoir and/or a natural body of water such as a lake, river or ocean, groundwater, or an aquifer. In the illustrated example, the compensation liquid source/sink 150 is illustrated as an open reservoir that can contain the desired compensation water.

Allowing the compensation liquid to flow through the conduit 58 may help ensure that a sufficient quantity of compensation liquid 20 may be maintained within shaft 18 and that excess compensation liquid 20 can be drained from shaft 18. The conduit 58 may be connected to the shaft 18 at any suitable location, and preferably is connected toward the upper end 48. Preferably, the conduit 58 can be positioned and configured such that compensation liquid will flow from the source/sink 150 to the shaft 18 via gravity, and need not include external, powered pumps or other conveying apparatus. Although the conduit 58 is depicted in the figures as horizontal, it may be non-horizontal.

In this embodiment, the system 10A includes a gas flow path that provides fluid communication between the compressor/expander subsystem 100 and the accumulator 12. The gas flow path may include any suitable number of conduits, passages, hoses, pipes and the like and any suitable equipment may be provided in (i.e. in air flow communication with) the gas flow path, including, compressors, expanders, heat exchangers, valves, sensors, flow meters and the like. Referring to the example of FIG. 1, in this example the gas flow path includes a gas conduit 22 that is provided to convey compressed air between the compressed gas layer 14 and the compressor/expander subsystem 100, which can convert the potential energy of compressed air to and from electricity. Similarly, a liquid supply conduit 40 is configured to convey water between the layer of compensation liquid 16 and the compensation liquid 20 in shaft 18. Each conduit 22 and 40 may be formed from any suitable material, including metal, the surrounding rock, plastic and the like.

In this example, the gas conduit 22 has an upper end 60 that is connected to the compressor/expander subsystem 100, and a lower end 62 that is in communication with the compressed gas layer 14. The gas conduit 22 is, in this example, positioned inside and extends within the shaft 18, and passes through the bulkhead 24 to reach the compressed gas layer 14. Positioning the gas conduit 22 within the shaft 18 may eliminate the need to bore a second shaft and/or access path from the surface to the accumulator 12. The positioning in the current embodiment may also leave the gas conduit 22 generally exposed for inspection and maintenance, for example by using a diver or robot that can travel through the compensation liquid 20 within the shaft 18 and/or by draining some or all of the water from the shaft 18. Alternatively, as shown using dashed lines in FIG. 1 (and in the other embodiments described herein), the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid supply conduit 40 is, in this example, configured with a lower or inner end 64 that is submerged in the layer of compensation liquid 16 while the system 10 is in use and a remote upper, or outer end 66 that is in communication with the interior 54 of the shaft 18. In this configuration, the liquid supply conduit 40 can facilitate the exchange of liquid between the layer of compensation liquid 16 and the compensation liquid 20 in the shaft 18. As illustrated in FIG. 1, the liquid supply conduit 40 can pass through the bulkhead 24 (as described herein), or alternatively, as shown using dashed lines, may be configured to provide communication between the layer of compensation liquid 16 and the compensation liquid 20, but not pass through the bulkhead 24.

In this arrangement, as more gas is transferred into the gas layer 14 during an accumulation cycle or charging mode the compensation water in the layer of compensation liquid 16 can be displaced and forced upwards through the liquid supply conduit 40 into shaft 18 against the hydrostatic pressure of the compensation liquid 20 in the shaft 18. More particularly, the compensation liquid can preferably freely flow from the layer of compensation liquid 16 within the accumulator 12 and into shaft 18, and ultimately may be exchanged with the source/sink 150 of water, via a replenishment conduit 58. Alternatively, any suitable type of flow limiting or regulating device (such as a pump, valve, orifice plate and the like) can be provided in the compensation conduit 40. When the system is operated in a discharging mode wherein gas is removed from the gas layer 14 and used to generate energy, compensation liquid flow from the shaft 18, through the compensation conduit 40, into the accumulator to refill the layer of compensation liquid 16 as the gas is withdrawn. As additional compensation liquid flows into the accumulator it helps maintain the accumulator pressure, even as gas is being withdrawn. This can help ensure that the pressure of the gas being extracted remains generally constant even when different amounts of gas are left in the accumulator 12. This can help the compression and expansion subsystem to operate in its intended, and preferably relatively efficient, ranges as the gas to be expanded is at a substantially constant pressure (and temperature if a suitable thermal conditioning systems is used) throughout the discharge mode.

The flow through the replenishment conduit 58 can help ensure that a desired quantity of compensation liquid 20 may be maintained within shaft 18 as compensation liquid is flows into and out of the layer of compensation liquid 16, as excess compensation liquid 20 can be drained from and make-up compensation liquid can be supplied to the shaft 18. This arrangement can allow the pressures in the accumulator 12 and shaft 18 to at least partially, automatically re-balance as gas is forced into and released from the accumulator 12. That is, the pressure within the accumulator 12 may remain relatively constant (e.g. within about 5-10% of the desired accumulator pressure) while the system is in the charging mode, storage mode and/or discharging mode. Any given system may be configured to have a desired accumulator pressure, but generally the accumulator pressures may be at least about 10 bar and generally may be between about 10 and about 80 bar or more, and may be between about 20 bar and about 70 bar, between about 40 and about 65 bar, and optionally between about 50 and about 60 bar.

For example, in the embodiment of FIG. 1, the accumulator pressure can be a function of both the accumulator depth 50 and the compensation liquid composition. If an accumulator pressure of about 60 bar is desired, the system 10A can be configured to use water (e.g. a liquid with a density of approximately 1000 kg/m$^3$) as a compensation liquid if the accumulator depth is about 600 m. However, if the accumulator depth 50 is less than 600 m, such as being approximately 200-250 m, then using water as a compensation liquid could limit the accumulator pressure to only about 20-25 bar. To achieve the desired 60 bar accumulator pressure the system 10A could utilize a slurry as its compensation liquid instead of water.

Preferably, the lower/inner end 64 of the liquid supply conduit 40 is positioned so that it is and remains submerged in the layer of compensation liquid 16 while the system 10 is in operational modes and is not in direct communication with the gas layer 14. In this arrangement, the layer of compensation liquid 16 can form a water seal that essentially separates the layer of compressed air 14 from the liquid supply conduit 40 and the interior of the shaft 18, which could provide an escape route for the pressurized air.

In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower/inner end 64 of the liquid supply conduit 40 is placed close to the lower wall 15. If the lower wall 15 is not flat or not generally horizontal, the lower/inner end 64 of the liquid supply conduit 40 is preferably located in a low point of the accumulator 12 to help reduce the chances of the lower/inner end 64 being exposed to the gas layer 14.

Similarly, to help facilitate extraction of gas from the gas layer when in a discharging mode, the lower end 62 of the gas conduit 22 is preferably located close to the upper wall 13, or if the upper wall 13 is not flat or generally horizontal at a high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

Preferably, as will be described, the pressure at which the quantity of compensation liquid 20 bears against bulkhead 24 and can be maintained so that magnitude of the counter force 46 is as equal, or nearly equal, to the magnitude of the internal accumulator force 41 exerted by the compressed gas in compressed gas layer 14 stored in accumulator 12. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit.

In this embodiment, a gas conduit 22 is provided to convey compressed air between the compressed gas layer 14 and the compressor/expander subsystem 100, which can convert compressed air energy to and from electricity. Similarly, a liquid conduit 40 is configured to convey water between the layer of compensation liquid 16 and the compensation liquid 20 in shaft 18. Each conduit 22 and 40 may be formed from any suitable material, including metal, plastic and the like.

Figure 2:
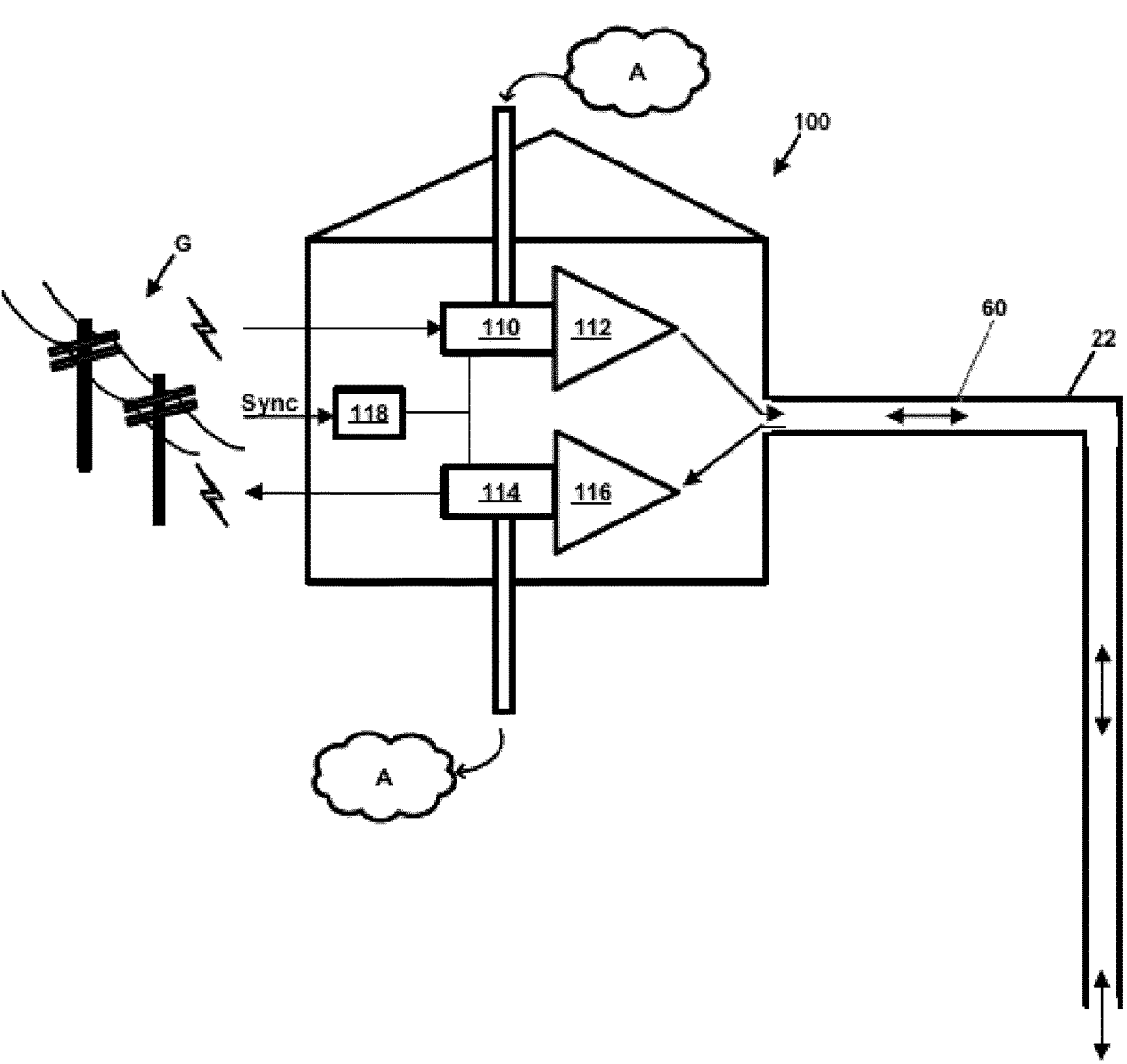
FIG. 2 is a schematic representation of a portion of the system of FIG. 1.

FIG. 2 is a schematic view of components of one example of a compressor/expander subsystem 100 for the compressed gas energy storage system 10 described herein. In this example, the compressor/expander subsystem 100 includes a compressor 112 of single or multiple stages, driven by a motor 110 that is powered, in one alternative, using electricity from a power grid G or by a renewable power source or the like, and optionally controlled using a suitable controller 118. Compressor 112 is driven by motor 110 during a compression mode or stage of operation, and draws in atmospheric air A, compresses the air, and forces it down into gas conduit 22 for storage in accumulator 12. Compressor/expander subsystem 100 also includes an expander 116 driven by compressed air exiting from gas conduit 22 during an expansion mode of operation and, in turn, driving generator 114 to generate electricity. After driving the expander 116, the expanded air is conveyed for exit to the atmosphere A. While shown as separate apparatuses, the compressor 112 and expander 116 may be part of a common apparatus, as can a hybrid motor/generator apparatus. Optionally, the motor and generator may be provided in a single machine.

Air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116. For example, air (or other gas being used) exiting a given stage of a compressor 112 may be cooled prior to entering a subsequent compressor stage and/or the accumulator 12, and/or the air may be warmed prior to entering a given stage of an expander 116 and may be warmed between expander stages in systems that include two or more expander stages arranged in series.

Controller 118 operates compressor and expander subsystem 100 so as to switch between compression and expansion modes as required, including operating valves for preventing or enabling release of compressed air from gas conduit 22 on demand.

Optionally, the system 10A may include a thermal storage subsystem that is configured to transfer heat/thermal energy out of and preferably also into the gas flowing through the gas flow path between the accumulator and the compressor/expander subsystem 100. Preferably, the thermal storage subsystem is configured to extract thermal energy from the gas exiting at least one of the one or more compression stages in a given compressor/expander subsystem 100, and preferably being configured to extract heat from the gas exiting each compression stage 112. The extracted thermal energy can then be stored for a period of time, and then reintroduced into the gas as it is removed from the accumulator 12 and passed through one or more expanders 116.

In this example of the system 10A the compressed air that is stored in the accumulator 12 is soluble in the water that forms the layer of compensation liquid 16. As there is a relatively large surface area/interface between the layer of gas 14 and the layer of compensation liquid 16 in the accumulator 12, the air may tend to dissolve into the water within the accumulator 12. As noted herein, the amount of air that can dissolve in the water layer 16 can be a function of the pressure within the accumulator 12 (i.e. the pressure of the gas and the compensation liquid at the interface) and the length of time the gas is in contact with the water, and possibly other factors. For example, more air may be dissolved into the layer of compensation liquid 16 if the accumulator pressure is 60 bar than if the accumulator pressure was 40 bar (with other conditions being generally the same). Similarly, for a given accumulator pressure, more air will be dissolved the longer the compressed air is in contact with the layer of compensation liquid 16. This may be most relevant when the system 10A is operated in its hold or storage mode with the accumulator 12 containing at least some compressed air. In this configuration, the compensation liquid is not flowing into or out of the accumulator in material quantities (subject to some minor circulation) and the layer of compensation liquid 16 can be in prolonged contact with the layer of compressed gas 14. As more time passes, more gas can be dissolved within the layer of compensation liquid 16 and the amount of air dissolved in the liquid can reach a champagne effect concentration (which as used herein refers to a relative amount of dissolved air compared to the fully saturated concentration that will trigger a material, undesirable champagne effect within the system). The champagne effect concentration may be different for different embodiments of the systems described herein, and may vary with accumulator depth, operating pressures and other factors. In some examples, the champagne effect concentration may be 20-50% of the fully saturated concentration of air.

The amount of time that the system 10A is held in this storage mode can define a contact time or storage period, and in some examples may be at least 4, 6, 8, 10, 12, 14, 16, 18, 20, 22, 24 hours or more, and in some circumstances may be at least 1, 2, 3, 4, 5, 6, 7, 8, 9, 10, 11, 12, 13, 14 days or more if the energy that is being stored by the system 10A is not needed for such periods of time.

Based on analysis conducted by the inventors, it has been determined that the length of the contact time has a significant impact on the amount of air that is dissolved within the layer of compensation liquid 16, for a system that is configured to operate at a given accumulator pressure. It can be desirable for the contact time or storage period to be below a champagne effect saturation threshold time, which can be understood to be the amount of time it takes for the compensation liquid in a given system 10, operating at a given pressure, to absorb enough air such that the dissolved gas concentration in the compensation liquid is a level such that the champagne effect may be likely to occur. In some environments, the champagne effect saturation threshold concentration that is to be avoided may be equal to or less than about 100, 95, 90, 85, 80, 75, 70, 65, 60, 55, 50, 45, 40 or 30 mol air/m$^3$ water (or compensation liquid as the case may be), and a target champagne effect saturation threshold that avoided may be less than about 80 mol air/m$^3$ water in some examples. The champagne effect saturation threshold time for a given system 10 may be less than 1, 2, 3, 4, 5, 6, months, and may be less than 1, 2, 3, 4 weeks in some circumstances.

When the system 10A is in its storage mode, the layer of compensation liquid 16 is generally static for the duration of the contact time and more air can be dissolved within the layer of compensation liquid 16 than is present in the water that is in the shaft 18 and/or source/sink 150. If, after a sufficiently long contact time, the system 10a is then operated in its charging mode, additional gas can be conveyed into the accumulator 12 and some of the compensation liquid in the layer 16 that contains relatively higher amounts of dissolved gas can be displaced from the accumulator 12 and can flow into the shaft 18, bringing with it a relatively large amount of dissolved air with it. If the amount of dissolved air is high enough this may lead to the champagne effect within the shaft 18.

FIG. 4 is a schematic illustration of another example of a hydrostatically compensated compresses gas energy storage system 10C, which is analogous to system 10A and like features are illustrated using like reference characters.

FIGS. 3 and 5-8 are schematic representations of other examples of a compressed gas energy storage systems 10B and 10D, respectively. The compressed gas energy storage system 10B and 10D are analogous to the compressed gas energy storage system 10A, and like features are identified using like reference characters. In these examples, the partition separating the interior of the accumulator 12 from the compensation shaft 18 at includes a projection 200A (identified using cross-hatching in FIG. 3) that can be formed from generally the same material as the surrounding ground 200. In this example, the systems 10B and 10D need not include a separately fabricated bulkhead 24 as shown in other embodiments. To help provide liquid communication between the interior of the shaft 18 and the layer of compensation liquid 16, a liquid supply conduit 40 can be provided to extend through the projection 200A or, as illustrated, at least some of the liquid supply conduit 40 can be provided by a flow channel that passes beneath the projection 200A and fluidly connects the shaft 18 to the layer of compensation liquid 16, and in ends 64 and 66 of the liquid supply conduit 40 can be the open ends of the passage.

Optionally, in such embodiments the gas supply conduit 22 may be arranged to pass through the partition/projection 200A as illustrated in FIG. 3. In this arrangement, the conduit 22 can be configured so that its end 62 is positioned toward the upper side of the accumulator 12 to help prevent the layer of compensation liquid 16 reaching the end 62. Alternatively, the gas supply conduit 22 need not pass through the partition, as schematically illustrated using dashed lines for alternative conduit 22. A thermal storage subsystem, including any can be used in combination with an accumulator 12 having this arrangement (see schematic representation 120 in FIG. 5). Some examples of suitable thermal storage subsystem are described in PCT/CA2018/050112 and PCT/CA2018/050282, which are incorporated herein by reference.

When the accumulator 12 is in use, at least one of the pressurized gas layer 14 and the layer of compensation liquid 16, or both, may contact and exert pressure on the inner surface 29 of the partition 200A, which will result in a generally outwardly, (rightwardly in the embodiment of FIG. 3) acting internal accumulator force, represented by arrow 41 in FIG. 3, acting on the partition 200A. The magnitude of the internal accumulator force 41 is dependent on the pressure of the gas 14/liquid 16 and the cross-sectional area of the inner surface 29. For a given inner surface 29 area, the magnitude of the internal accumulator force 41 may vary generally proportionally with the pressure of the gas 14 and/or compensation liquid 16.

Preferably, an inwardly, (leftwardly in the embodiment of FIG. 3) acting force can be applied to the outer surface 31 of the partition 200A, via the hydrostatic pressure of the compensation liquid, to help offset and/or counterbalance the internal accumulator force 41. Applying a hydrostatic counter force of this nature may help reduce the net force acting on the partition 200A while the system 10 is in use.

In the present embodiment, the system 10 includes a shaft 18 having a lower end 43 that is in communication with the opening 27 in the upper wall 13 of the accumulator 12, and an upper end 48 that is spaced apart from the lower end 43 by the shaft height (which corresponds to the accumulator depth 50 in this example). At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear or helical decline, in other embodiments. The upper end 48 of the shaft 18 may be open to the atmosphere A, as shown, or may be capped, enclosed or otherwise sealed. The shaft 18 in these embodiments may be similar in size and configuration to the other shafts 18 described herein.

As described herein, the systems 10B and 10D can be operated in charging, discharging and storage modes and the interface between the layer of compensation liquid 16 and the layer of compressed gas 14 is disposed somewhere between the upper and lower walls 13 and 15 of the accumulator 12. The precise level of the interface, which can also be expressed in terms of a height 700 of the liquid layer 16 can vary while the system 10B and 10D are in use. As relatively more air is forced in the accumulator 12 during the charging mode the height 700 can decrease. As air is released during the discharging mode, the height 700 can increase. In these embodiments, the compressed air in the gas layer 14 is isolated from the shaft 18 by keeping a sufficient amount of compensation water within the liquid supply conduit 40, which is a generally U-shaped passage that extends below the bottom wall 15 of the accumulator 12 in these schematic illustrations, but may have different configurations in other examples.

To help preserve this type of water seal between the gas layer 14 and shaft 18, the systems 10B and 10D can be operating having regard to a fully charged configuration, which can define a predetermined limit or the charging of the systems 10B and 10D when in normal use. In the embodiment of FIG. 4, for example, the system 10D can be considered to be fully charged when the height 700 of the liquid layer 16 is reduced to approximately 0, i.e. when the surface of the liquid is driven to a position in which it is generally co-planar the lower wall 15, shown as the plane 702 (the "charge plane"). In this configuration (see FIG. 6a), substantially all of the interior of the accumulator 12 is exposed to the air/gas. Moving the surface of the liquid layer beyond the charge plane 702 may increase the chances of air from the accumulator 12 escaping via the liquid supply conduit 40 and entering the shaft 18. In this embodiment, the pressure of the system 10D in the fully charged can be expressed as a function of the height 704 of the shaft 18, from the surface (i.e. upper surface of the liquid) to charge plane 702, where the fully charged operating pressure is defined as the product of the density of the compensation liquid (i.e. water or other suitable compensation liquid), the gravitational constant "g" and the height 704.

Figure 5:
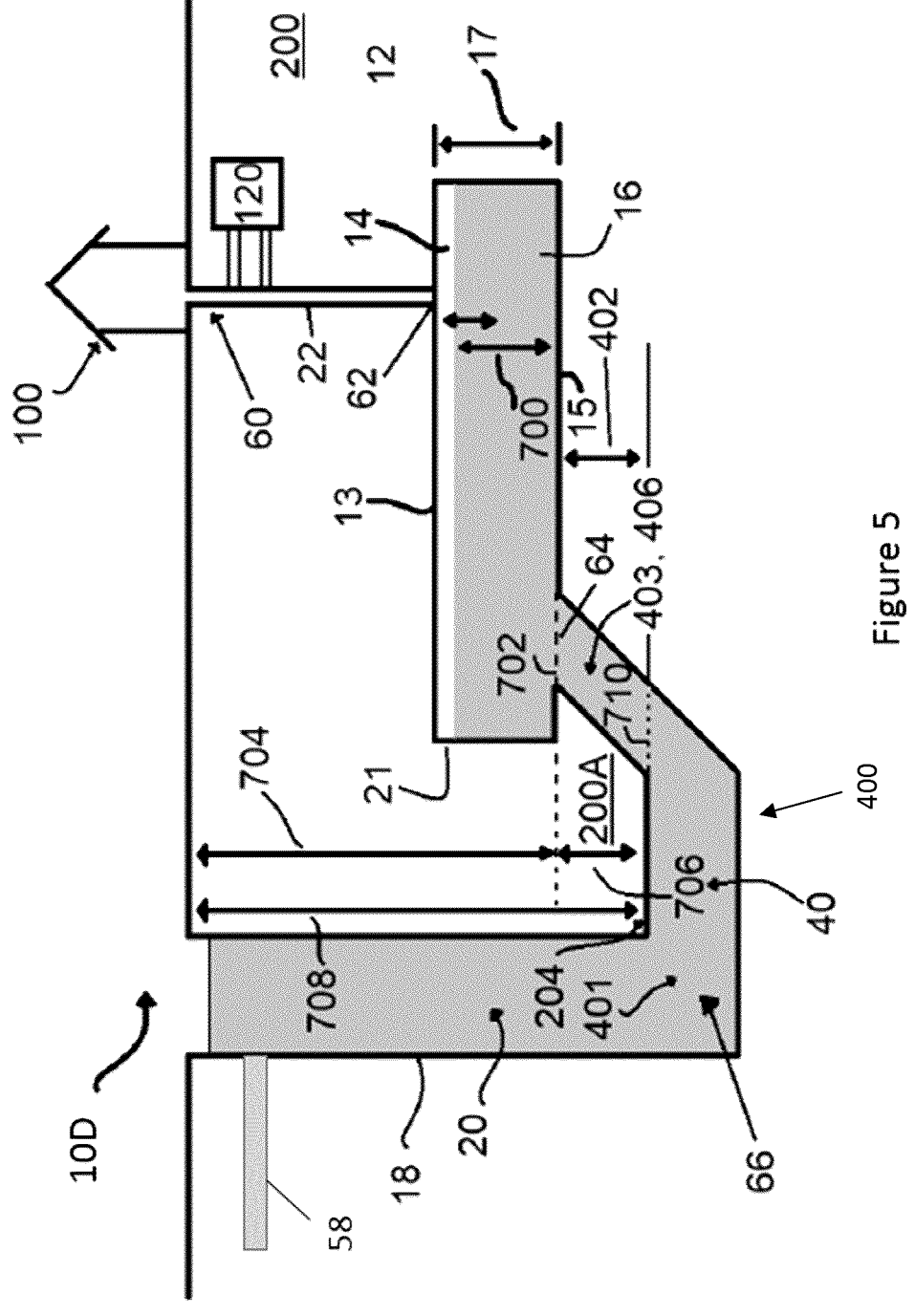
FIG. 5 is a schematic representation of another example of a hydrostatically compressed gas energy storage system.

As shown in FIG. 5, in the system 10D the partition 200A is configured such that its lower end 204 is spaced below the lower surface 15 of the accumulator and charge plane 702, by a partition height 706. It can also be seen that an overall height 708 can be defined as the sum of heights 704 and 706. In this arrangement, the system 10D can be considered over-charged if the level of the water is forced downward through the liquid supply conduit 40 such that the water level reaches lower plane 710 (the "overcharge plane"). In this position, gas leakage from the accumulator 12 into the shaft 18 may occur. The overcharge pressure required to reach this state can be defined as the product of the density of the liquid (i.e. water), the gravitational constant "g" and the height 708. In other words, the difference in the desired fully charged operating pressure and the overcharge pressure for a given system can be related to the magnitude of the partition height 706. As height 706 increases, the difference between the fully charged pressure and the overcharged pressure increases. That is, the more the system 10C can exceed its desired fully charged pressure without reaching the overcharged pressure. This difference or pressure range can represent a pressure operating sensitivity or tolerance of the system 10C. In a given embodiment, a desired pressure operating tolerance can be selected by increasing or decreasing the partition height 706. In some embodiments, the projection height 706 may be between 1 and 50 m, and preferably may be between about 5 m and about 30 m as described further herein.

These features of the system 10D can be configured, for a given system, to provide an overcharge buffer apparatus to help preserve the desired water seal/trap in the event of an over charging/over-filling the accumulator 12. In the embodiment for FIG. 5, the overcharge buffer apparatus 400 can be incorporated in to features of the liquid supply conduit 40 and the flow channel that passes beneath the projection 200A. Such features may include a lower flow portion 401 that is positioned below the lower wall 15 of the accumulator 12 by at least a buffer height 402. The overcharge buffer apparatus may further include a transition portion 403 extending upwardly from the overcharge plane 710 between the lower flow portion 401 and the charge plane 702 which defines an interface between the transition portion 403 and the accumulator interior 23 and comprises a buffer portion 406 extending upwardly from the overcharge plane 710 by the buffer height 402. Additional examples of suitable overcharge buffer apparatus features and configurations can be found in PCT publication no. WO 2019/218084 that is incorporated herein by reference.

However, as described herein, even if such overcharge buffer apparatuses are implemented on a system and function as intended so that compensation liquid does not initially drop to the overcharge plane 710 by virtue of adding further gas in the accumulator 12, it is possible for air that has been dissolved within the compensation liquid to move through the conduit 40 while dissolved and into the shaft 18 even if the water seal described herein remains intact. As the compensation liquid moves up the shaft 18, the reducing in the hydrostatic pressure can allow the air to come out of solution and form bubbles, which can cause and/or accelerate an upward flow compensation liquid within the shaft (shown schematically in FIG. 6a). If this champagne effect is substantial enough, the increase flow of compensation liquid up the shaft 18 may draw an additional volume of compensation liquid out of the conduit 40 and/or layer of compensation liquid 16 (if any). If the amount of compensation liquid that is drawn in via the champagne effect is more than the volume that is held in the a transition portion

403 (as illustrated in FIG. 5) then the level of compensation liquid my drop below the overcharge plane 710 and gas may escape into the shaft 18, as illustrated schematically in FIG. 6b.

One optional mechanism to help reduce the impact of the champagne effect in the systems 10 described herein, that may be used alone or in combination with other mechanisms described herein, may be to operate the systems 10 in a manner that limits the amount of time that the high pressure gas is in contact with the layer of compensation liquid 16 within the accumulator 12, which may help limit the amount of air that is dissolved within the liquid. For example, cycling at least some of the water within the accumulator 12 to exchange the water that is in contact with the pressurized gas may help limit the amount of air that is dissolved in a given quantity of water to an amount that is below the champagne effect concentration. Water that is withdrawn from the accumulator 12 during cycle compensation liquid cycling activities can be conveyed toward the surface and/or source/sink 150, for example by travelling up the shaft, such that the dissolved air can be released in an acceptable manner.

Preferably, if the system 10D is going to be put on stand-by for a relatively long time (e.g. longer than 1-2 weeks or more), such as during a maintenance period or other periods of non-use, the systems 10D should be configured so that the accumulator 12 is essentially full of the compensation liquid (see FIG. 8) and the air supply conduit 22 can optionally be isolated from the interior of the accumulator 12. This configuration can reduce the contact between the pressurized gas and the compensation liquid.

Figure 7:
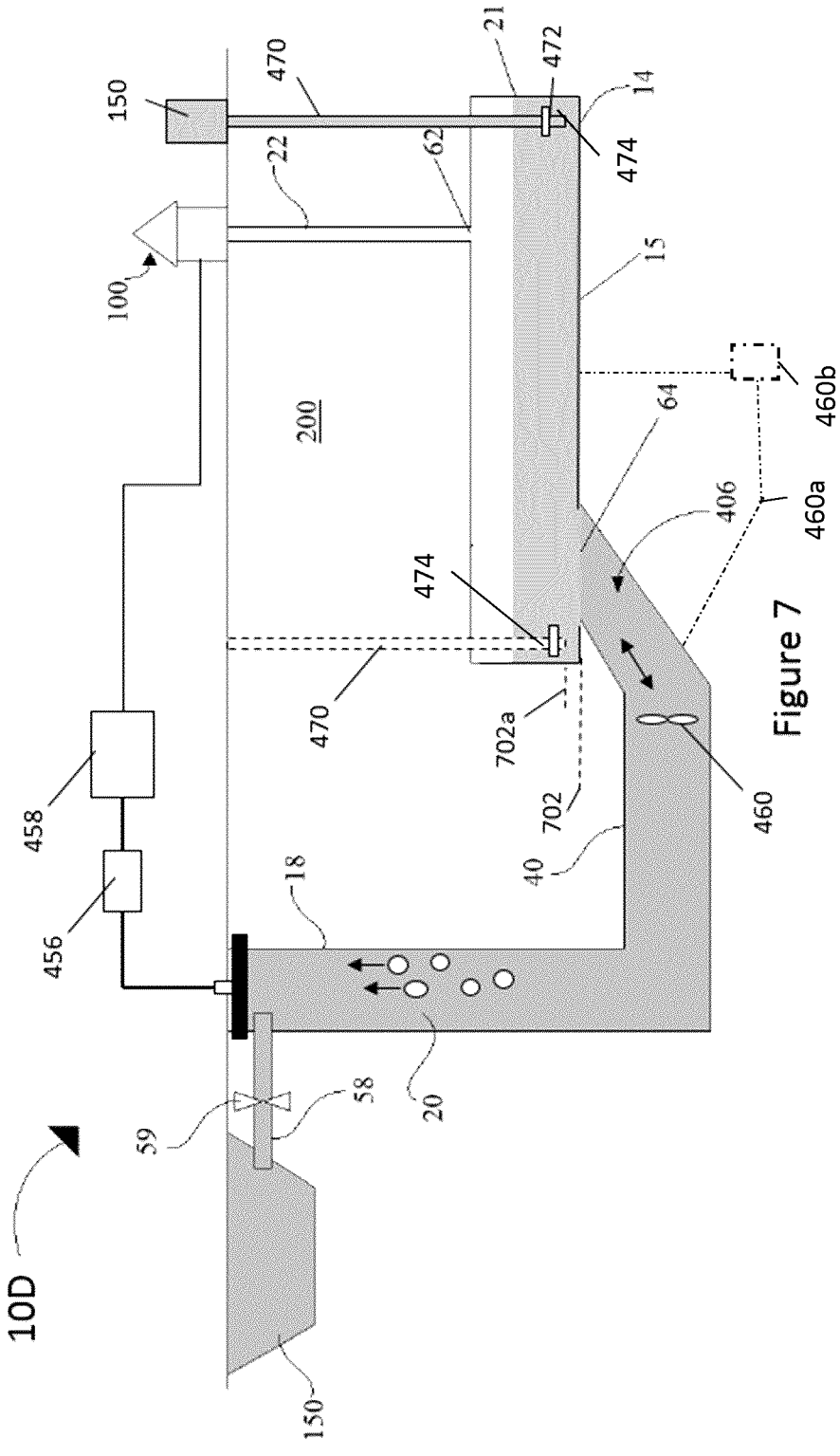
FIG. 7 is the hydrostatically compressed gas energy storage system of FIG. 5 in a partially discharged configuration.
Figure 8:
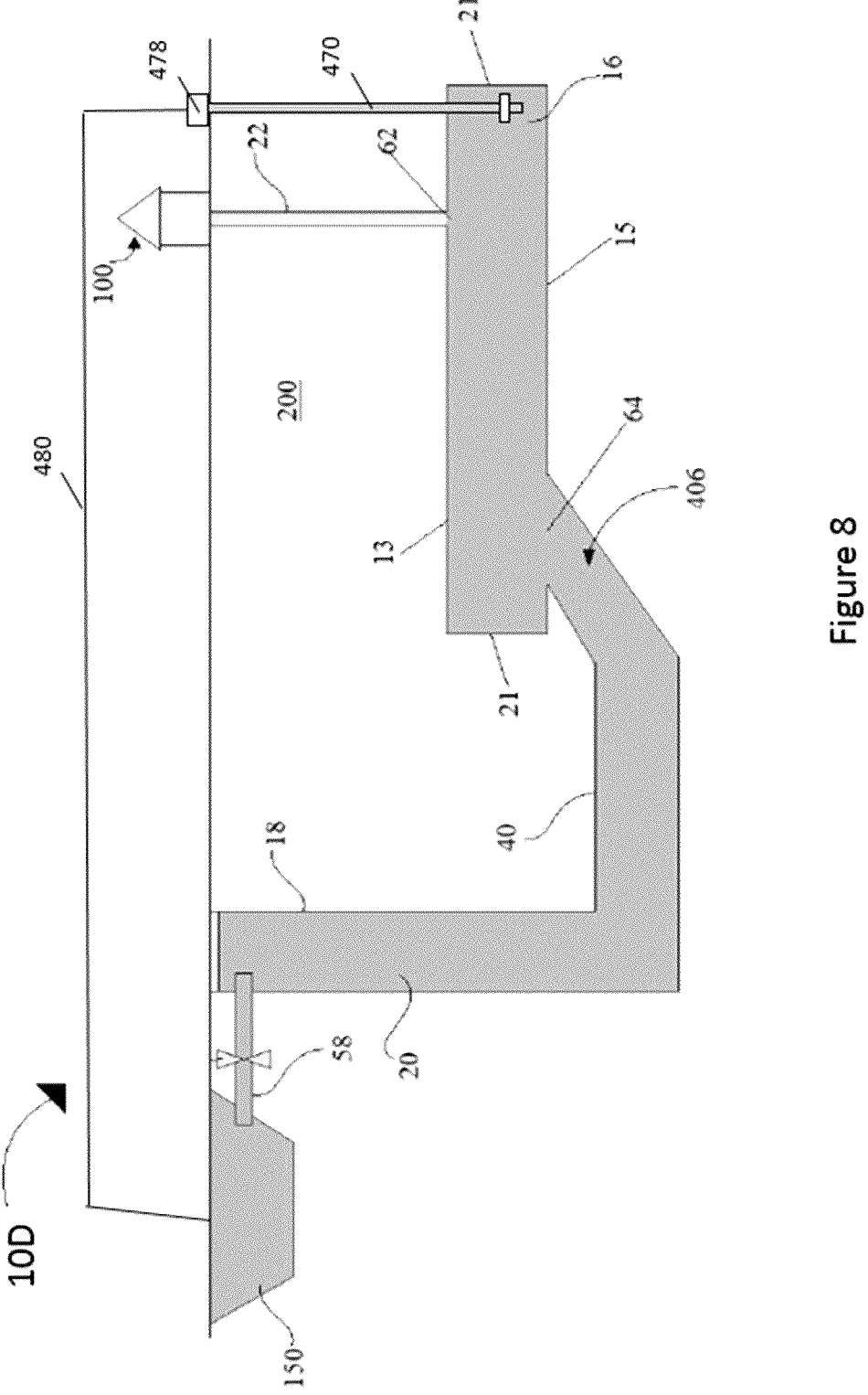
FIG. 8 is the hydrostatically compressed gas energy storage system of FIG. 5 in a discharged configuration.

If the system 10D is held in the storage mode or put on stand-by for a long time while partially charged (e.g. with the accumulator 14 partially full of air as shown in FIG. 7) then, preferably, the system 10D should be at least partially discharged before charging. Discharging gas from the accumulator 12 will reduce the size of the layer of gas 14 and will draw additional compensation liquid rom the shat 18 into the accumulator 12. The compensation liquid drawn in in this manner will have less dissolved air than the liquid that was in the layer of compensation liquid 16 during the stand-by period and will mix with the liquid already in the accumulator 12, thereby lowering the average concentration of dissolved gas in the combined compensation liquid—preferably to an amount that is below the champagne effect saturation concentration. If the system 10D is then operated in the charging mode the compensation liquid that is displaced from the accumulator 12 into the shaft 18 will be less likely to trigger and adverse champagne effect event. This type of delayed start-up procedure, in which the system is first at least partially discharged before beginning a charging cycle and be used when the system has been in storage or on stand-by for a relatively long period of time, instead of simply charging the system right away.

Figure 9:
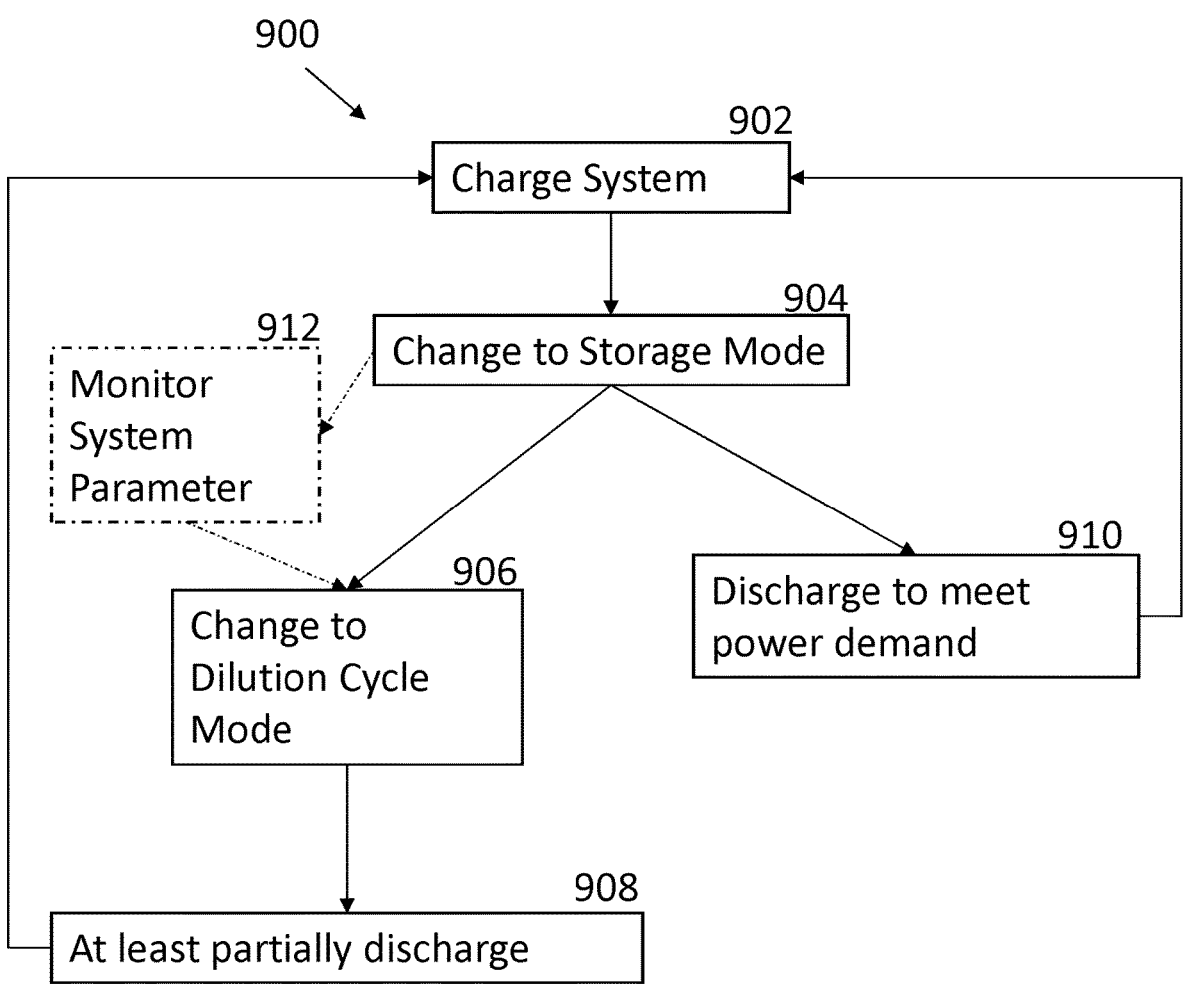
FIG. 9 is one example of a method operating a hydrostatically compensated compressed air energy storage system.

Referring also to FIG. 9, one illustration of an exemplary method of operating a hydrostatically compensated compressed air energy storage system, including any of the exemplary systems described herein to help inhibit champagne effect conditions. In this example, the method 900 can include, at step 902 charging the system by compressing air to the storage pressure in accordance with the techniques described herein and conveying the compressed air into the layer of compressed air in the accumulator using a compressor and expander system (such as the compressor and expander system 100) thereby displacing a corresponding amount of compensation liquid from the layer of compensation liquid into a compensation liquid flow path outside the accumulator. Charging the system in this manner can be done when there is excess electricity demand, as described herein, so that the energy can be stored in the systems described herein.

When the system is charged, either fully or partially depending on excess power generation, to its desired or needed level, the system can be changed into its storage mode, at step 904, in which the layer of compressed air and the layer of compensation liquid are retained within the accumulator at substantially the storage pressure and there is substantially no flow of gas/air into or out of the accumulator. Changing from the charging mode to the storage mode can be done automatically using any suitable system controller and control systems, or can be trigger by a system operator or other suitable mechanisms.

While the system is in its storage mode the compressed air that is at the storage pressure in the accumulator is in communication with the layer of compensation liquid for the period of time while the system is in storage mode. This storage duration/time period can be described as a storage contact time, and during this time at least a portion of the compressed air in the layer of compressed air will tend to dissolve into the layer of compensation liquid. This dissolving of gas into the compensation water can increase a dissolved gas concentration in the layer of compensation liquid. The dissolved gas concentration may tend to increase over time when the system is in the storage mode, unless and until the amount of air/gas that is dissolved in the compensation liquid reaches a champagne effect saturation threshold which is a understood to be a pre-determined dissolved gas concentration limit which, when reached, is likely to lead to champagne effect conditions within the shaft 18 during discharge or is otherwise selected as a target gas concentration level that is preferably not exceeded when the system is in use. When left for a sufficient period of time the dissolved gas concentration may reach the gas saturation limit or a maximum gas concentration for the liquid (under the given operating conditions or pressure, temperature, compensation liquid composition, etc.). The maximum gas concentration or saturation limit for a compensation liquid may be different in different versions of the systems described herein.

As described above, the systems are generally intended to remain in their storage mode until the demand for electricity rises to a level where it is desirable and economical for the system to be converted to its discharge mode and the compressed air is extracted from the accumulator and is used to drive the associated expanders and generator (such as 114 and 116) and power can then be returned to the grid G (such as at step 910). However, the inventors have determined that it can be desirable to operate the systems in a dilution cycle mode which is intended to help limit and/or reduce the dissolved gas concentration in the compensation liquid that is within the accumulator 12 and in the layer of compensation liquid 16, and that it can be desirable to do this at a pre-determined time or in response to certain operating conditions, even if/when such cycling or discharging is not desired for generating power to return to the grid. That is, the systems 10 can be operated and at least partially discharged and/or recharged even at times when power generation is not required/demanded and may be perhaps times when discharging and recharging the accumulator is not economically advantageous.

For example, instead of proceeding to the normal discharging mode at step 910 when electrical power is demanded, the systems can instead proceed to an alternative step 906 in which the system is operated in a dilution cycle mode. Preferably, the dilution cycle mode can be triggered before the dissolved gas concentration in the layer of compensation liquid exceeds the predetermined champagne effect saturation threshold for a given system configuration. The dilution cycle mode can start at step 906 and can include, at step 908, discharging at least a portion of the compressed air from the accumulator thereby drawing additional compensation liquid having a lower dissolved gas concentration than the liquid in the layer of compensation liquid into the accumulator from the compensation liquid flow path. Because the liquid held in the shaft 18 when the system is in its storage mode is not in direct contact with the compressed gas in the gas layer 14, the liquid in the shaft 18 will generally have a lower concentration of dissolved gas/air than the liquid that is within the accumulator 12 in layer 16. Therefore, withdrawing gas from the accumulator 12 and drawing in fresh compensation liquid from the shaft 18 will have the effect of generally reducing an average dissolved gas concentration in the layer of compensation liquid 16 within the accumulator. The amount of discharging that is conducted at this step 908 can vary between a relatively small, partial discharge such as discharging 5%, 10%, 15%, 20%, 25%, 30%, 35%, 40%, 45%, 50% or more of the volume of gas in the accumulator, and can be a substantially complete or complete discharge of the system and can include discharging 55%, 60%, 65%, 70%, 75%, 80%, 85%, 90%, 95% or 100% (e.g. fully discharging the system) of the volume of gas in the accumulator.

Having completed the desired, at least partial discharge at step 908, the dilution cycle mode can then include the step of re-charging the system, such as by returning to charging step 902 by conveying additional compressed air into the layer of compressed air in the accumulator thereby displacing a corresponding amount of compensation liquid from the layer of compensation liquid into a compensation liquid flow path and returning the system to the storage mode.

Preferably, the systems can enter their dilution cycle modes before the storage contact time meets or exceeds a pre-determined storage time at which point the liquid in the layer 16 is likely to have absorbed enough dissolved gas to pose a champagne effect risk if it were to enter the shaft 18. This time can be referred to as a dilution cycle time, and may be different for different examples of the systems described herein, and/or under different operating conditions. The dilution cycle time is preferably equal to or less than the champagne effect saturation threshold time for a given system (which is understood to be the amount of time it takes for the an amount of compressed air dissolved in the layer of compensation liquid 16 to reach a champagne effect saturation concentration at the storage pressure), and optionally can be about 5%, 10%, 15%, 20%, 25%, 30%, 35%, 40%, 45%, 50%, 55%, 60%, 65%, 70%, 75%, 80%, 85%, 90% less than the anticipated champagne effect saturation concentration for the system. This may help increase the system safety factor of the system.

Optionally, the systems can be operated so that step 908 is initiated at the conclusion of the pre-determined dilution cycle time, regardless of electricity/power demand, actual gas concentration in the layer 16 or other such factors. The dilution cycle time can be any suitable amount and can be different for different systems. In some arrangements, the dilution cycle time may be between 1 day and 6 months or more, or may be between 2 days and 4 weeks, and may be equal to or less than 1, 2, 3, 4, 5, 6 or more weeks, and may be equal to or less than 1, 2, 3, 4, 5, 6, 7, 8, 9, 10, 11 or 12 months and may be equal to or less than 1, 2, 3, 4, or 5 years or more.

Triggering the dilution cycle mode may be done using any suitable system controller (such as controller 118 and/or controller 458) that is configured to generate an output signal when the storage contact time meets the dilution cycle time—or may be trigger manually by system operators on a pre-determined frequency. For example, the system controller may be configured to automatically switch the system from the storage mode to the dilution cycle mode when the storage contact time meets the dilution cycle time and/or at a point when the dilution cycle time is equal to or less than the champagne effect saturation threshold time.

Optionally, instead of triggering the dilution cycle mode based on a predetermined dilution cycle time, the systems may be configured to monitor one or more suitable system parameters or values, optionally using the system controller and suitable sensors or detectors, and can then triggering the dilution cycle mode based on the state or value of the relevant system parameter or value. For example, the concentration of dissolved gas within the layer 16 and/or within the shaft 18 can be monitored using any suitable apparatus or gas monitoring system (optionally directly or via other representative measurements) while the system is in use, and the dilution cycle mode can be triggered if the detected dissolved gas concentration surpasses a pre-determined concentration threshold value.

For example, the method 900 may include the optional step 912 of monitoring at least one system parameter while the system is in use, such as monitoring the dissolved gas concentration in at least one of the layer of compensation liquid 16 and the compensation liquid flow path (such as in shaft 18) while the system is in the storage mode to determine a monitored gas concentration, and then proceeding to step 906 when the monitored concentration meets or exceeds a predetermined monitoring threshold limit or value. This can be done using any suitable mechanism, including a gas monitoring system. The system can be configured so that the outputs from the gas monitoring system are provided to the system controller which can then provide a system operator with an output signal (such as a warning or alert) and/or may automatically change the system from the storage mode to the dilution cycle mode before or when the monitored gas concentration meets the champagne effect saturation threshold.

Optionally, step 912 can include the system generating a warning signal using the controller if the current gas concentration is equal to or greater than a predetermined warning gas concentration that is lower than the champagne effect saturation threshold. This may be preferably because it may help the system, or system operator, to take action to help reduce the average gas concentration within the layer 16 before it reaches the champagne effect saturation threshold. For example, the warning gas concentration may be predetermined for a given system and may be between about 40% and about 100% of the champagne effect saturation threshold for such system, or may be set to be between about 60% and about 90% of the champagne effect saturation threshold, or other desired ranges. The champagne effect saturation threshold for dissolved gas within the layer 16 and/or shaft 18 may be different in different systems, but in some examples may be concentrations that are equal to or less than about 95%, 90%, 85%, 80%, 75%, 70%, 65%, 60%, 55%, 50%, 45%, 40%, 35%, 30%, 25%, 20%, 15% of the champagne effect saturation threshold for a given system.

When operating the systems as described herein, circumstances may dictate that the system is changed from the storage mode to the dilution cycle mode after charging the system but before the system is otherwise be operated in a discharge mode in which air from the layer of compressed air exits the accumulator and drives the gas compressor and expander subsystem for the purpose of generating electricity in response to a demand for electricity. Somewhat counter-intuitively, the dilution cycle mode may be triggered within an external demand for electricity generation or other production-related need, and may result in some short term, commercially inefficient operating of the system as power may be produced when it is not needed or the prices are relatively low, and the system may need to be at least partially re-charged during on peak times when the electricity is relatively scarce and/or relatively expensive, but such operation may help improve the overall operation and/or safety of the system.

In addition to utilizing a dilution cycle mode as described, the method of operating the system may also include using other system components to help dilute the gas concentration within the layer 16 or shaft 18, as an alternative to or in addition to cycling the compressed gas using the compressor and expander system. This can include using any of the features and systems described herein, including introducing a flow of a dilution liquid into the layer of compensation liquid while the system is in the storage mode thereby replacing at least some of the compensation liquid in the layer of compensation liquid 16 with the dilution liquid and reducing the dissolved gas concentration in the layer of compensation liquid without having to trigger the dilution cycle mode. Like drawing in fresh, non-gas saturated water from the shaft 18, introducing another liquid (preferably the same water that flows through the shaft 18) to mix with the liquid in the layer 16 that has a higher concentration of dissolved gas will have the effect of diluting the liquid in the layer 16 and reducing its average dissolved gas concentration.

Optionally, as described herein, the flow of the dilution liquid may be conveyed from a dilution liquid source to the accumulator via a one-way dilution liquid flow path configured such that dilution liquid can flow from the dilution liquid source into the accumulator via the dilution liquid flow path but compensation liquid cannot flow exit the accumulator via the dilution liquid flow path. This may help prevent gas or liquid escape from the accumulator via the dilution liquid flow path.

Preferably, as described herein, the dilution liquid includes the same compensation liquid that is used in the operation of the system and is drawn from compensation liquid that was external the accumulator and has a lower concentration of dissolved air than the compensation liquid in the layer of compensation liquid 16 when the system is the storage mode.

In some systems, the cycling of the water in the accumulator 12 may occur as part of the normal operation of the system, such as by alternatingly charging and discharging the accumulator 12 by adding and removing compressed air during routing charge and discharge process and/or if the system is operated in the optional dilution cycle mode as described herein. Alternatively, or in addition to cycling of the accumulator, the system 10D can include a compensation circulation system that is configured to pump or otherwise circulate compensation liquid between the layer of compensation liquid 16 within the accumulator and the larger volumes of compensation liquid in the shaft 18 and source/sink 150. This liquid circulation may be done at the same time that gas is being conveyed into or out of the accumulator 12, but may also be done independently of the charging and discharging of the system 10D such that compensation liquid can be circulated also while the system 10D is in its storage/standby mode. The compensation circulation system can include any suitable combination of pumps, propellers, mixers conduits, controllers and the like create a flow/circulation within the compensation liquid. In the embodiment of FIG. 7, one example of a circulation device is schematically illustrated using reference character 460, and it can be controlled by system controller 458 or any other suitable control mechanism. In this schematic example the circulation device can include an impeller/propeller or any other type of mechanism that can be driven to cause the liquid in the passage 40 to flow either toward or away from the layer 16—and preferably to generally flow between the layer 16 and the shaft 18. Circulating the compensation water in this manner may be done without substantially effecting the charge or gas storage aspect of the system, and minor, time-limited changes in the amount of water in the layer 16 can be accommodated by temporary expansion or compression of the air in the layer 14.

In another possible configuration, the compensation circulation system can include an optional circulation flow path 460a that is separate from the main compensation flow path and can include a pump 460b or other such device that can convey compensation liquid into, and/or remove compensation liquid from the layer 16 in the accumulator 12 and exchange it with fresh, less gas-saturated compensation liquid from other portions of the compensation flow path like shaft 18 or passage 40)

In this example, the hydrostatically compensated compressed air energy storage system 10D is understood to include one example a compensation circulation system configured to help inhibit champagne effect conditions within a compensation liquid as it includes an accumulator 12 containing the layer of compressed air 14 above a layer of compensation liquid 16, a compensation liquid reservoir 150 spaced apart from the accumulator 12 and in fluid communication with the layer of compensation liquid 14 within the accumulator via the compensation liquid flow path (including at least the conduit shaft 18 and passage 40 and/or source 150) and a compressor and expander subsystem 100 in fluid communication with the accumulator interior via an air flow path and configured to selectably convey compressed air into the accumulator at a storage pressure and to extract air from the accumulator as described herein. This system 10D also includes a compensation circulation system that is configured to exchange a quantity of compensation liquid between the layer of compensation liquid 16 in the accumulator 12 and the compensation liquid flow path (such (including at least the conduit shaft 18 and passage 40 and/or source 150) independently of the addition or removal of compressed air from the accumulator. This can allow the average dissolved gas concentration in the layer of compensation liquid 16 within the accumulator 12 to be modified and preferably reduced while the system is in use, including when in the storage mode, without requiring the addition or removal of compressed gas.

In this arrangement, as described herein, the compensation liquid in the compensation liquid flow path (18, 40 and 150) will generally contain less dissolved gas than the compensation liquid in the layer of compensation liquid 16. This may mean that the compensation liquid in the compensation liquid flow path has a relatively higher density than the compensation liquid in the layer of compensation liquid 16, which includes relatively more dissolved air/gas.

In this arrangement the system is operable in: a) a charging mode in which the gas compressor and expander subsystem 100 coveys compressed air at a storage pressure into the layer of compressed air 14 which displaces a corresponding amount of compensation liquid from the layer of compensation liquid 16 out of the accumulator via the compensation liquid flow path thereby maintaining the layer of compressed air 14 at substantially the storage pressure during the charging mode, b) a discharging mode in which air from the layer of compressed air exits the accumulator 12 and drives the gas compressor and expander subsystem to generate electricity in response to a demand for electricity and a corresponding amount of compensation liquid is re-introduced into the layer of compensation liquid 16 within the accumulator interior via the compensation liquid flow path thereby maintaining the layer of compressed air at substantially the storage pressure during the discharging mode; and c) a storage mode in which there is no flow of the compressed air or compensation liquid and the layer of compressed air and the layer of compensation liquid are retained within the accumulator at substantially the storage pressure, and the compensation circulation system is configured to exchange the quantity of compensation liquid between the layer of compensation liquid 16 in the accumulator 12 and the compensation liquid flow path independently of the addition or removal of compressed air from the accumulator 12 and while the system is in the storage mode.

That is, when the system is in the storage mode the compensation liquid in the layer of compensation liquid comprises a first concentration of dissolved gas and wherein the compensation liquid in the compensation liquid flow path outside the accumulator has a second concentration of dissolved gas that is lower than the first concentration.

In the schematic examples illustrated herein, the compensation liquid flow path includes the source 150 and a compensation conduit that extends between a lower end in communication with the accumulator interior (such as the end 64 of the passage 40) and an upper end, such as an upper end of the shaft 18 that is in communication with the compensation liquid reservoir 150.

Optionally, as an alternative to or in addition to including the compensation circulation system as described herein, the system can also include other features that are described herein, like the a dilution system that includes a source of a dilution liquid and a dilution flow path in fluid communication with the accumulator interior and configured to supply a flow of the dilution liquid into the layer of compensation liquid when the system is in use thereby reducing an average dissolved gas concentration in the layer of compensation liquid within the accumulator.

Another optional mechanism to help reduce the impact of the champagne effect in the systems 10 described herein, that may be used alone or in combination with other mechanisms described herein, is to include a pressure balancing system that can help automatically compensate or rebalance the pressure between the gas and the liquid in the system when a champagne effect event occurs. One way of providing such pressuring balancing can be to configure the system to include a suitable fluid passage 40/water trap and to operate the system such as a corresponding, predetermined balancing volume of compensation liquid is maintained within the accumulator 12 while the system is in use (including when in it is considered to be in in its fully charged state). As described herein, a material champagne effect event within the compensation liquid flow path (e.g. within shaft 18) can create a pressure imbalance within the system 10D, such that the hydrostatic pressure within the compensation liquid flow path is at least temporarily reduced to a level that is lower than the accumulator pressure, allowing the gas to expand beyond its intended operating limits/locations. For example, for a system having an operating accumulator pressure of about 60 bar, a material champagne effect in the shaft 18 may have the effect of reducing the weight of the liquid in the shaft 18 by about 0-5% or more, which could result in the effective hydrostatic pressure in the compensation liquid to about 57 bar at the charge plane 702.

In anticipation of such events, the water seal features of the system can be optionally be configured so that the partition height 706 is set to account for the pressure change of a champagne effect event. For example, if it is estimated that a champagne effect event will reduce compensation liquid pressure by about 5%, the partition height 706 can be configured to be about 5% of the depth 704 to the charge plane 702. That is, if the depth 704 to the charge plane 702 is 600 m the partition height 706 may be selected to be about 30 m. If, when a champagne effect event occurs in the system, the air/water interface descends through the conduit 40 toward the overcharge plane 710 it will add about 3 bar of gravity head to the water in the compensation shaft 18, thereby balancing the pressure difference before a significant gas escape/blow out event occurs. If such conditions are detected by the controller 458 corrective actions can be taken, such as stopping the charging of the system (e.g. shutting down the compressors), operating an accumulator isolation valve, operating an accumulator blow-off valve or the like. If it is expected that the champagne effect event will reduce compensation liquid pressure by about 1, 2, 3 or 4% then the partition height 706 may be configured to be about 1, 2, 3 or 4% of the depth 704 to the charge plane 702, respectively. However, there may be some circumstances where there are physical, geological and/or financial constraints that can limit the desired partition height 706.

Alternatively, or in addition to modifying the partition height 706, another way of rebalancing the pressure between the gas and the liquid in the system can be to configured to the systems herein so as to maintain minimum a height 700 of the liquid layer 16 while the systems are in use, which can provide a balancing volume of compensation liquid in the system. For example, if it is estimated that a champagne effect event will reduce compensation liquid pressure by about 5%, then a balancing volume of compensation liquid of about the same amount (e.g. that is about 5% of the accumulator volume) can be maintained in the accumulator 12 even when the system is considered to be fully charged. That is, a balancing charge plane (see plane 702a) can define a minimum height 700 of the layer of compensation liquid 16 above the bottom wall 15 of the accumulator. During normal operating, charging of the system will stop when the water reaches this level. If a champagne effect event were to occur that reduced the compensation liquid pressure to about 57 bar, this balancing quantity of liquid would be drawn from the accumulator 12 into the water trap/conduit 40 to compensate for the liquid drawn up the shaft 18, which would have the effect of temporarily increasing the available gas volume within the accumulator 12. Gas from the layer 14 would expand to fill the available volume thereby decreasing the gas pressure (for example to about 57 bar in this example), re-establishing the pressure equilibrium between the gas layer 14 and compensation liquid and thereby maintaining the isolation between the gas layer 14 and the shaft 18 until the champagne effect event has passed. If it is expected that champagne effect event will reduce compensation liquid pressure by about 1, 2, 3 or 4% then the location of the balancing charge plane 702a and corresponding minimum height 700 of the layer of compensation liquid 16 can be configured so that a balancing amount of compensation liquid of about 1, 2, 3, 4, 5, 6, 7, 8, 9, 10% or more of the accumulator volume is provided.

Optionally, these two pressure balancing techniques can be used in combination with each other in a given system as the effects are generally linearly additive to each other. That is, for amount of pressure correction that is achieved by one technique reduces the remaining pressure difference to be handled by the other technique be a corresponding amount. For example, if the expected pressure drop caused by the champagne effect event is about 5% (or about 3 bar in the illustrated example), this may be counter balanced by: i) providing a partition height 706 that is about 5% of the depth 704 and providing 0% balancing amount of compensation liquid; ii) providing a partition height 706 that is about 4% of the depth 704 and providing 1% balancing amount of compensation liquid; ii) providing a partition height 706 that is about 3% of the depth 704 and providing 2% balancing amount of compensation liquid; iv) providing a partition height 706 that is about 2% of the depth 704 and providing 3% balancing amount of compensation liquid; v) providing a partition height 706 that is about 1% of the depth 704 and providing 4% balancing amount of compensation liquid; vi) providing a partition height 706 that is about 0% of the depth 704 and providing 5% balancing amount of compensation liquid; and vii) any combination in which the partition height 706 that is about x % of the depth 704 and about (5−x) % of balancing amount of compensation liquid is provided.

Another optional mechanism to help reduce the impact of the champagne effect in the systems 10 described herein, that may be used alone or in combination with other mechanisms described herein can include a compensation water dilution system that can be used to provide a supply dilution liquid into the layer 16 of compensation liquid that is in the accumulator 12. The dilution liquid may be any liquid that has a relatively lower concentration of dissolved gas/air than the expected dissolved gas concentration of the liquid that is forming the layer 16 at any given time. Suitable dilution liquids can include the same liquid that is used as the main compensation liquid, such as water, etc. that has not been exposed to the compressed air or that otherwise has a relatively lower concentration of dissolved gas. The dilution liquid could also include pure water, oils, slurries, mixtures and other liquids that have the desired, relatively lower dissolved air concentration and are compatible with the operation of the systems as described herein. In the preferred examples described below the dilution liquid is a supply of fresh, non-air saturated compensation water that is used in the normal operation of the system and would be initially provided in the layer of compensation liquid 16 within the accumulator 12 when the system is charged. This incoming dilution liquid can displace gas-saturated (or at least partially saturated) liquid from the accumulator and into the shaft 18 at an acceptable and predetermined rate, and preferably independently of whether the air is moving into or out of the layer 14 or is static. The mixing of the saturated and non-saturated water within the layer 16 may also reduce the average air saturation or dissolved aid concentration in the liquid that remains, and therefore reduce the overall, average air concentration of the water in the layer of compensation liquid 16. If fresh compensation liquid is supplied to the accumulator 12 in an ongoing manner it can essentially cycle or partially replace the water in the layer of compensation liquid 16 on an ongoing (or optionally on demand basis), while the system is in the charging, discharging or storage mores. Dilution liquid that is added to the layer 16 via the dilution system will mix with the liquid in the layer 16 and due to the balancing of the compressed air, the excess volume of liquid that is present in the layer 16 will tend to flow toward the shaft 18 and source 150, (for example via passage 40) as the overall height of the layer 16 is a balance of hydrostatic and gas pressures. Therefore, adding dilution liquid into the layer 16 can also have the somewhat indirect effect of diluting the water in other portions of the compensation flow path, such as passage 40 and shaft 18 as the fresh, dilution liquid (such as water) moves from the accumulator 12 into the shaft 18 due to the system pressures.

This supply of diluting compensation water can be provided during one or more of the charging mode, discharging mode and the storage mode as part of the normal operation of the system, or optionally may be triggered if the gas saturation reaches a warning or alarm threshold within the shaft 18 or other portions of the system. For example, the system could be configured to include a generally consistent, incoming flow of the dilution liquid so that any liquid that is held in layer 16 is being somewhat diluted (e.g. its average dissolved gas concentration) on an ongoing manner while the system is in use. This may help prevent, or at least reduce the rate of increase of, dissolved gas accumulating within the layer 16 in a generally ongoing or continuous, preventative manner. This type of ongoing, steady state operation may help keep the dissolved gas concentration in the layer 16 relatively low. Alternatively, the flow of dilution liquid into the layer 14 may be triggered after a certain time or in response to a detected increase in the dissolved gas concentration in the layer 16, such that the dilution system operates in an on-demand type manner and is only operated when certain system conditions are met. This may allow the dissolved gas concentration in the layer 16 to increase over time when the dilution system is inactive, decrease in response to the operation of the dilution system and then continue in this cycle while the system is in use.

To provide fresh, non-saturated compensation liquid (or other suitable dilution liquid) to the accumulator 12 the system includes a dilution flow path which, in the illustrated example can include one or more dilution shafts 470 that can extend from a supply of compensation liquid 150 (that may be the same or separate from the source/sink 150 that is connected to the shaft 18). The dilution shafts 470 can be smaller than the main shaft 18 as they do not need to accommodate the same flow volume of compensation liquid. That is, the flow rate of compensation liquid along the main compensation liquid flow path (such as during charging and discharging cycles) can define a first flow rate of the compensation liquid and the dilution flow path can be sized so that it accommodates a second or dilution flow rate of the dilution liquid (e.g. compensation liquid) that is less first flow rate, and optionally can be than 50%, 45%, 40%, 35%, 30%, 25%, 20%, 15%, 10%, 5% or less of the first, compensation liquid flow rate. This may help reduce energy consumption and liquid supply requirements of the dilution system while still helping to dilute the layer 16.

Unlike shaft 18, to help prevent further risks of the champagne effect occurring within dilution shafts 470, the dilution shafts 470 are preferably configured to be one direction or one way flow paths (downward/inward only flow shafts as shown) such that dilution liquid (such as water) can flow from source 150 into the accumulator 12 via shaft 470 but the dilution liquid, compensation liquid and compressed air are all inhibited and preferably prevented from flowing out of the accumulator 12 via shaft 470. In this arrangement, the water within dilution flow path, and shaft 470 will be limited to the incoming dilution liquid (such as fresh, non-saturated water) and it will not be contaminated with gas-saturated water or compressed air exiting the accumulator 12, which could, if left uncontrolled lead to champagne effect problems within the dilution flow path and/or allow an unintended escape of the compressed air. The one-way nature of the shafts 470 can be accomplished using any suitable backflow limiter or flow restricting/limiting devices, include a check valve apparatus 472 (FIG. 7) which can include one or more suitable check valves or other backflow limited devices. The backflow limiter preferably prevents the flow of the compensation liquid out of the accumulator via the dilution flow path (e.g. up conduit 470).

Preferably, the outlet/lower end 474 of the dilution shaft 470 is positioned within the accumulator 12, and preferably in the lower half of the accumulator 12, and in a location where it will tend to be submerged within the layer of compensation liquid 16 when the system 10D is in use. For example, the lower end 474 can be positioned so that it is disposed in a lower half or 50% of the accumulator interior, and more preferably in a lower 25% of the accumulator interior. In this arrangement, the lower end 474 is located so that it will be below the charge plane (such as charge plane 702 described herein and defined by an upper surface of the layer of compensation liquid when the system is in a fully charged configuration) which can help ensure that the lower end 474 is submerged within the layer of compensation liquid 16 when the system is in the storage mode, and when fully charged.

In some arrangements, the lower end 474 of the dilution conduit/shaft 470 can be located so that it is at a higher elevation than and is remote or space apart from the location where the main compensation passage meets the accumulator, which may be the location of the end 64 of the passage 40 as illustrated. Spacing the end 474 of the shaft 470 away from the passage 40 may help facilitate mixing of the incoming dilution liquid within the layer 16 before it reaches the passage 40 where it may exit the accumulator. The system of any one of claims to [00177], wherein the compensation liquid flow path comprises a compensation conduit (shaft 18) extending between a lower end (end 64) in communication with the accumulator interior and an upper end in communication with the compensation liquid reservoir.

Alternatively, as shown using the optional dashed conduit 470 location, the lower end 474 of the dilution shaft 470 can be located so that it is close to, and possibly overlies, the end 64 of the passage 40. In this arrangement, the lower end 474 is considered to be is adjacent the lower end of the compensation conduit. In this configuration, the dilution liquid exiting the shaft 470 may flow relatively directly into the passage 40. This may help provide dilution liquid in portions of the compensation flow path that is outside the accumulator 12 (such as in the passage 40 and shaft 18) which may be desired in some circumstances, such as when champagne effect conditions may be starting in the shaft 18. Optionally, the dilution system could include two or more shafts 470 and different shafts may be located in different portions of the accumulator.

In the illustrated examples, the dilution shafts 470 are shown as being external the compensation flow path, and specifically external the shaft 18 and passage 40. Alternatively, the dilution conduits 470 could be positioned so that they extend at least partially within the compensation conduit/shaft. while still maintaining fluid separation between the dilution liquid within the conduit 470 and the compensation liquid in the shaft 18 and passage 40 (see for example the optional conduit 470 locations shown in the drawings, including FIG. 4).

While limiting upflow of water into the shaft 470 can be desirable, it may be preferably that water can flow from the shaft 470 relatively freely, such as in response to a pressure change within the accumulator 12 cause via water being drawn from the accumulator in response to a champagne effect event. Alternatively, the compensation dilution system can include pumps, valves, flow control mechanisms to pump water via the dilution shaft 470. That is, preferably, the dilution system, and any associated backflow limiting devices can be configured to allow a generally free flow of dilution liquid into the accumulator, such as under the influence of gravity and/or to allow the dilution liquid to flow in the first direction without significant restriction into the accumulator interior in response to a low pressure suction condition within the accumulator interior. Such a low pressure condition may occur if compensation liquid flows out of the layer 16 faster than is intended, such as if a champagne effect condition were to occur within the shaft 18 and has the effect of drawing additional liquid from the layer 16 into the passage 40 and shaft 18.

Figure 6A:
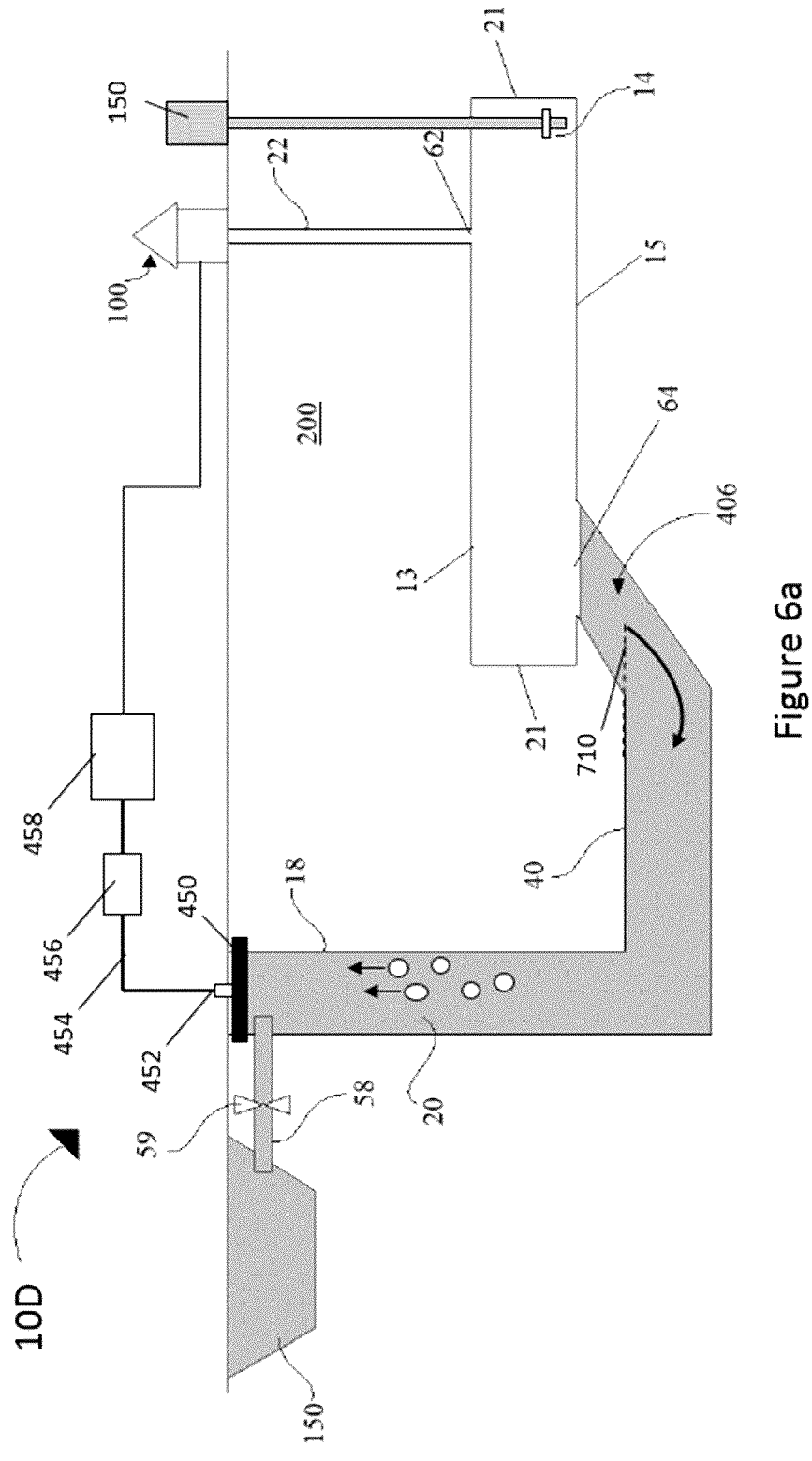
FIG. 6a is the hydrostatically compressed gas energy storage system of FIG. 5 in a first configuration.
Figure 6B:
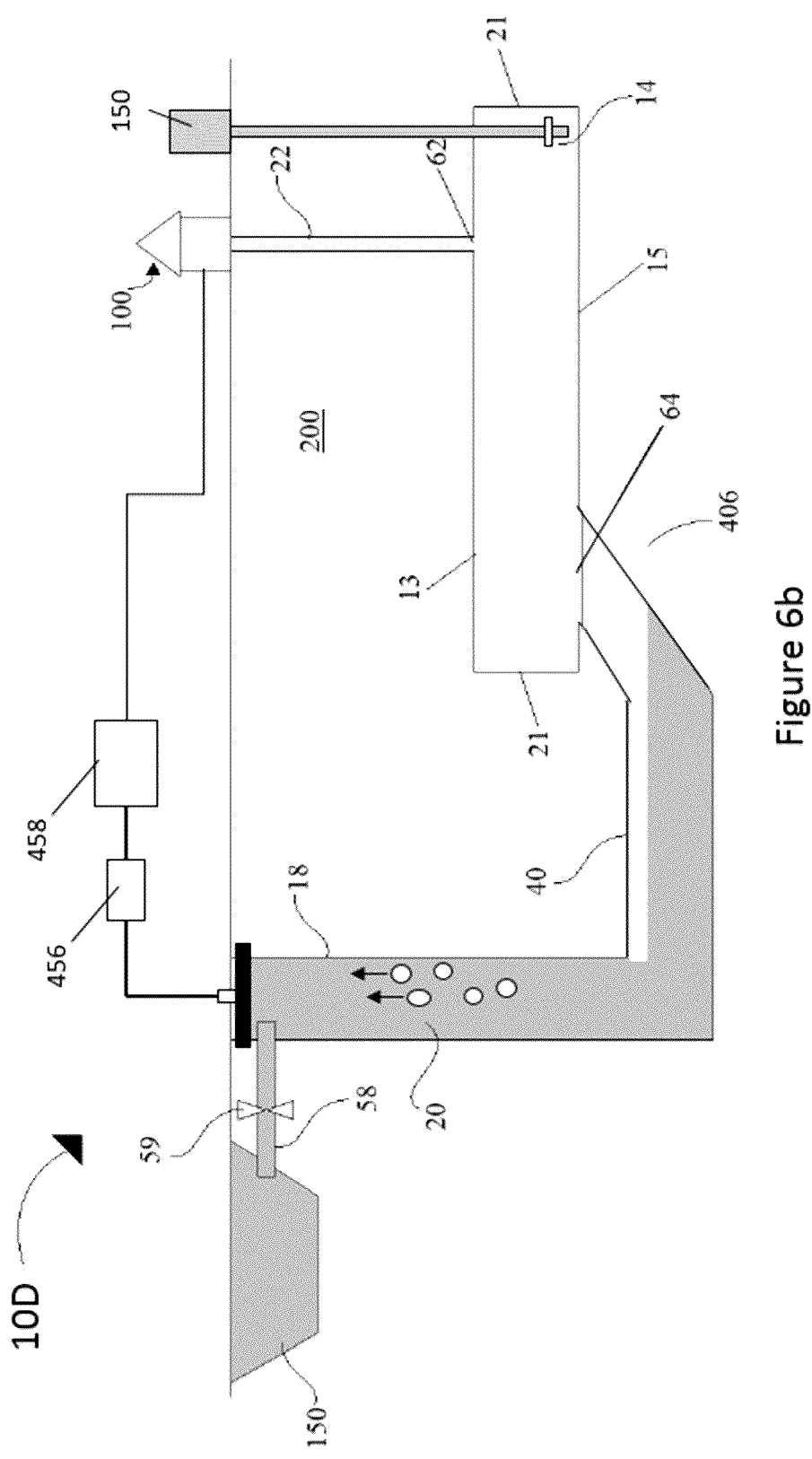
FIG. 6b is the system of FIG. 6a with the compensation liquid in a different configuration.

While shown as being connected to separate sources 150 in FIGS. 6a-7, the shafts 18 and 470 can be connected to a common source, such as the common compensation liquid reservoir 150. For example, in one preferred example of the systems 10 described herein, a pump 478 (shown schematically in FIG. 8) can be provided at or toward the upper end of the dilution shaft 470 and can be connected to the main reservoir 150 via a dilution supply line 480. This pump 478 can be used to convey water from the reservoir 150 to the upper end of the dilution shaft 470, and as water is added to the dilution shaft 470 it will tend to travel down the dilution shaft 470, into and through the accumulator 12 and can then be drawn up the main compensation shaft 20 as described herein.

These systems, including the systems shown in FIGS. 6a-8 can be described as hydrostatically compensated compressed air energy storage systems that include a dilution system that is configured to inhibit champagne effect conditions within a compensation liquid by allowing dilution of the compensation liquid in the layer 16 independently from adding or removing gas from the layer 14. These systems can generally include any version of the accumulator and the compressor and expander subsystems described herein, along with a compensation liquid reservoir spaced apart from the accumulator and in fluid communication with the layer of compensation liquid within the accumulator via a compensation liquid flow path whereby compensation liquid is displaced from the layer of compensation liquid when the compressed air is conveyed into the layer of compressed air when the system is in use. To help reduce the likelihood of an average dissolved gas concentration in the layer 16 reaching the champagne effect threshold concentration, the systems can optionally include a dilution system comprising a source of a dilution liquid (such as the sources 150 described above) and a dilution flow path (including the dilution shaft 470) in fluid communication with the accumulator interior and configured to supply a flow of the dilution liquid into the layer of compensation liquid 16 when the system is in use thereby reducing an average dissolved gas concentration in the layer of compensation liquid within the accumulator as, for example, the dilution liquid mixes with the compensation liquid in the layer of compensation liquid and exits the accumulator interior via the compensation liquid flow path. Under these conditions the dilution liquid preferably contains less dissolved gas than the compensation liquid in the layer of compensation liquid, and may therefore have a relatively higher density than the compensation liquid in the layer of compensation liquid 16.

In these examples, the systems is operable in a charging mode in which the gas compressor and expander subsystem 100 coveys compressed air at a storage pressure into the layer of compressed air 14 which displaces a corresponding amount of compensation liquid from the layer of compensation liquid 16 out of the accumulator 12 via the compensation liquid flow path (including passage 40 and shaft 18) thereby maintaining the layer of compressed air 14 at substantially the storage pressure during the charging mode, and the dilution system is configured to provide the flow of the dilution liquid into the layer of compensation liquid 16 via the dilution flow path (including shaft 470) while the system is in the charging mode.

Similarly, systems may be operable in a discharging mode in which air from the layer of compressed air exits the accumulator 12 and drives the gas compressor and expander subsystem 100 to generate electricity in response to a demand for electricity and a corresponding amount of compensation liquid is re-introduced into the layer of compensation liquid 16 within the accumulator interior via the compensation liquid flow path (such as from shaft 18 via passage 40) thereby maintaining the layer of compressed air 14 at substantially the storage pressure during the discharging mode, and preferably the dilution system can be configured to provide the flow of the dilution liquid into the layer of compensation liquid via the dilution flow path while the system is in the discharging mode. That is, configuring the dilution system such that the dilution liquid can flow through conduit 470, regardless of the direction of flow of compensation liquid in the shaft 18 or the absence of flow in the shaft 18 can allow the dilution system to operate generally independently of the compensation liquid system.

Similarly, the system can be operable in a storage mode in which there is no flow of the compressed air or compensation liquid and the layer of compressed air and the layer of compensation liquid are retained within the accumulator at substantially the storage pressure, and the dilution system is preferably configured as described herein to provide the flow of the dilution liquid into the layer of compensation liquid via the dilution flow path while the system is in the storage mode.

Optionally, a system that includes the dilution system as described herein can also include other features of the systems described herein, such as including a gas monitoring system operable to monitor an amount of dissolved gas present in at least one of the layer of compensation liquid and the compensation liquid flow path. The controller, such as the controllers described herein, can be linked to the gas monitoring system and can be configured to generate a warning signal if the amount of dissolved gas present in the in at least one of the layer of compensation liquid and the compensation liquid flow path exceeds a warning threshold amount. This may also be used to determine if the dilution system should be activated and/or if a flow of the dilution liquid should be increased or decreased. For example, the controller can be configured to automatically adjust the operation of at least one of the compressor and expander subsystem and the dilution system in response to the warning signal.

Another optional mechanism to help reduce the impact of the champagne effect in the systems 10 described herein, that may be used alone or in combination with other mechanisms described herein, can include a process or system for monitoring the likelihood of a champagne effect event by monitoring the amount of air that is present in the compensation liquid within the shaft 18. This may help predict whether a champagne effect event is likely to occur, as relatively higher amounts of air in the shaft 18 may increase the changes of a champagne effect event occurring as compared to the presence of relatively lower amounts of air in the shaft 18. For example, the systems described herein can include a gas monitoring system having a variety of sensors, conduits, valves, and other similar equipment that is operable to detect an amount of gas that comes out of solution from the compensation liquid as the compensation liquid travels upwardly through the compensation conduit 18, and preferably the controller can be communicably linked to the gas monitoring system and can be configured to generate an output signal if the amount of gas detected by the gas monitoring system exceeds a pre-determined monitoring threshold amount.

Preferably, the system can be configured to measure the amount of air in the shaft 18 and compare it to one or more predetermined monitoring thresholds, such as a warning threshold and an alert/shutdown threshold value, that are based on predetermined amounts/levels of air within the shaft 18. If the amount of air in the shaft reaches the warning threshold, the system (via a controller, computer or other suitable system) can generate a warning signal that can be displayed to the system operators, such as a warning message on a screen, a flashing light, an audible noise or siren or the like. This can alert operators of an increase in the amount of air within the shaft 18. A suitable system controller may also, preferably, be configured to automatically adjust at least one parameter of the system, such as halting the charging of the accumulator, opening a release mechanism or the like to help reduce chances of a champagne effect event occurring. If the amount of air reaches the alert/shutdown threshold, the system may be configured to automatically halt any further air compression, to introduce additional compensation liquid into the system or take other corrective actions to help prevent a champagne effect event from occurring.

The amount of air in the shaft 18 can be measured using an suitable technique or sensor that is compatible with the systems 10 and has sufficient resolution and response time to detect and preferably quantify the amount of air in the shaft 18. One example of a gas monitoring system can be a gas detection system that includes a collector in form of a cap 450 or other suitable device that can cover the upper end of the shaft 18. This cap 450 is optional, and need not be included in all examples of the systems described herein.

Air bubbles that have come out of solution within the shaft 18 will float upwardly in the shaft 18 and can be collected beneath the cap 540. A gas release mechanism 452, such as a valve, float valve or the like, can be provided in the system (either directly associated with the cap 450 or in an alternative location, such as in a fluidly connected two-phase separator tank) can be configured to allow the gas to escape from the shaft 18. The gas can be conveyed along a suitable conduit 454 which can include a flow meter 456 or other suitable mechanism that can measure the flow of gas. Signals from the flow meter 456 can be provided to a suitable system controller/computer 458 which can compare the gas flow rate (or other suitable measurement of gas volume, quantity, etc.) to the system's predetermined threshold values, and can trigger a warning or control other system equipment, such as the compressor and expander subsystem 100, based on the amount of gas detected. For example, if the detected gas flow surpasses the system 10D's alert threshold the controller 458 may cause the compressor and expander subsystem 100 to shut down, convert the system to dilution cycle mode, activate the dilution system and/or may turn on a compensation liquid circulation device 460 or take other such action to help arrest the champagne effect.

What has been described above has been intended to be illustrative of the invention and non-limiting and it will be understood by persons skilled in the art that other variants and modifications may be made without departing from the scope of the invention as defined in the claims appended hereto.

We claim:

1. A hydrostatically compensated compressed air energy storage system including a dilution system configured to inhibit champagne effect conditions within a compensation liquid, the system comprising:

a) an accumulator disposed underground and comprising an accumulator interior configured to contain a layer of compressed air above a layer of compensation liquid;

b) a compressor and expander subsystem in fluid communication with the accumulator interior via an air flow path and configured to selectably convey compressed air into the accumulator at a storage pressure and to extract air from the accumulator;

c) a compensation liquid reservoir spaced apart from the accumulator and in fluid communication with the layer of compensation liquid within the accumulator via a compensation liquid flow path whereby compensation liquid is displaced from the layer of compensation liquid when the compressed air is conveyed into the layer of compressed air when the system is in use, wherein the compensation liquid flow path includes a compensation conduit extending between a lower end in communication with the accumulator interior and an upper end in communication with the compensation liquid reservoir; and d) a dilution system comprising a source of a dilution liquid and a dilution flow path in fluid communication with the accumulator interior and configured to supply a flow of the dilution liquid into the layer of compensation liquid when the system is in use thereby reducing an average dissolved gas concentration in the layer of compensation liquid within the accumulator, wherein the dilution flow path includes a dilution conduit separate from the compensation conduit.

2. The system of claim 1, wherein the dilution liquid mixes with the compensation liquid in the layer of compensation liquid and exits the accumulator interior via the compensation liquid flow path.

3. The system of claim 1, wherein the dilution liquid contains less dissolved gas than the compensation liquid in the layer of compensation liquid.

4. The system of claim 1, wherein the system is operable in a charging mode in which the compressor and expander subsystem coveys compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode, and the dilution system is configured to provide the flow of the dilution liquid into the layer of compensation liquid via the dilution flow path while the system is in the charging mode.

5. The system of claim 1, wherein the system is operable in a storage mode in which there is no flow of the compressed air or compensation liquid and the layer of compressed air and the layer of compensation liquid are retained within the accumulator at substantially the storage pressure, and the dilution system is configured to provide the flow of the dilution liquid into the layer of compensation liquid via the dilution flow path while the system is in the storage mode.

6. The system of claim 1, wherein the compensation liquid in the layer of compensation liquid comprises a first concentration of dissolved gas and wherein the dilution liquid is compensation liquid having a second concentration of dissolved gas that is lower than the first concentration.

7. The system of claim 6, wherein the source of the dilution liquid comprises the compensation liquid reservoir.

8. The system of claim 1, wherein the dilution flow path is configured to permit the flow of dilution liquid in a first direction into the accumulator and to inhibit a flow of compensation liquid in an opposing second direction out of the accumulator.

9. The system of claim 1, wherein the dilution conduit has a lower end that is disposed within the accumulator.

10. The system of claim 9, wherein the system comprises a charge plane defined by an upper surface of the layer of compensation liquid when the system is in a fully charged configuration, and wherein the lower end is disposed below the charge plane.

11. The system of claim 9, wherein the lower end is positioned so that it is submerged within the layer of compensation liquid when the system is in a storage mode.

12. The system of claim 9, wherein the lower end of the dilution conduit is at a higher elevation than the lower end of the compensation conduit.

13. The system of claim 12, wherein the lower end of the dilution conduit is adjacent the lower end of the compensation conduit.

14. The system of claim 12, wherein the dilution conduit is external to the compensation conduit.

15. The system of claim 12, wherein the dilution conduit extends at least partially within the compensation conduit.

16. The system of claim 1, further comprising a pump disposed in the dilution flow path and configured to selectably pump the dilution liquid down the dilution flow path and into the accumulator interior.

17. A hydrostatically compensated compressed air energy storage system including a compensation circulation system configured to inhibit champagne effect conditions within a compensation liquid, the system comprising:
  a) an accumulator disposed underground and comprising an accumulator interior configured to contain a layer of compressed air above a layer of compensation liquid;
  b) a compressor and expander subsystem in fluid communication with the accumulator interior via an air flow path and configured to selectably convey compressed air into the accumulator at a storage pressure and to extract air from the accumulator;
  c) a compensation liquid reservoir spaced apart from the accumulator and in fluid communication with the layer of compensation liquid within the accumulator via a compensation liquid flow path whereby compensation liquid is displaced from the layer of compensation liquid when the compressed air is conveyed into the layer of compressed air when the system is in use; and
  d) a compensation circulation system comprising an impeller/propeller positioned in the compensation flow path and configured to selectively cause flow between the layer of compensation liquid and the compensation liquid flow path to exchange a quantity of compensation liquid between the layer of compensation liquid in the accumulator and the compensation liquid flow path independently of addition or removal of compressed air from the accumulator, thereby reducing an average dissolved gas concentration in the layer of compensation liquid within the accumulator while the system is in use.

18. The system of claim 17, wherein the compensation liquid in the compensation liquid flow path contains less dissolved gas than the compensation liquid in the layer of compensation liquid.

19. The system of claim 17, wherein the system is operable in:
  a) a charging mode in which the compressor and expander subsystem coveys compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode,
  b) a discharging mode in which air from the layer of compressed air exits the accumulator and drives the compressor and expander subsystem to generate electricity in response to a demand for electricity and a corresponding amount of compensation liquid is re-introduced into the layer of compensation liquid within the accumulator interior via the compensation liquid flow path thereby maintaining the layer of compressed air at substantially the storage pressure during the discharging mode; and
  c) a storage mode in which there is no flow of the compressed air or compensation liquid and the layer of compressed air and the layer of compensation liquid are retained within the accumulator at substantially the storage pressure, and the compensation circulation system is configured to exchange the quantity of compensation liquid between the layer of compensation liquid in the accumulator and the compensation liquid flow path independently of the addition or removal of compressed air from the accumulator and while the system is in the storage mode.

20. The system of claim 17, further comprising a dilution system comprising a source of a dilution liquid and a dilution flow path in fluid communication with the accumulator interior and configured to supply a flow of the dilution liquid into the layer of compensation liquid when the system is in use thereby reducing an average dissolved gas concentration in the layer of compensation liquid within the accumulator.

* * * * *